United States Patent
Shi et al.

(10) Patent No.: US 10,956,835 B2
(45) Date of Patent: Mar. 23, 2021

(54) ANALYTIC SYSTEM FOR GRADIENT BOOSTING TREE COMPRESSION

(71) Applicant: SAS Institute Inc., Cary, NC (US)

(72) Inventors: Rui Shi, Bethlehem, PA (US); Guixian Lin, Cary, NC (US); Xiangqian Hu, Cary, NC (US); Yan Xu, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 16/297,952

(22) Filed: Mar. 11, 2019

(65) Prior Publication Data

US 2020/0027028 A1 Jan. 23, 2020

Related U.S. Application Data

(60) Provisional application No. 62/716,502, filed on Aug. 9, 2018, provisional application No. 62/701,224, filed on Jul. 20, 2018.

(51) Int. Cl.
  *G06N 20/20* (2019.01)
  *G06N 5/04* (2006.01)

(52) U.S. Cl.
  CPC .............. *G06N 20/20* (2019.01); *G06N 5/04* (2013.01)

(58) Field of Classification Search
  CPC .................................. G06N 20/20; G06N 5/04
  See application file for complete search history.

(56) References Cited

U.S. PATENT DOCUMENTS

| | | | |
|---|---|---|---|
| 9,495,426 | B2 | 11/2016 | Meng et al. |
| 2009/0125155 | A1 | 5/2009 | Hill et al. |

(Continued)

FOREIGN PATENT DOCUMENTS

| | | |
|---|---|---|
| WO | WO2018/006004 | 1/2018 |
| WO | WO2018/089574 | 5/2018 |

OTHER PUBLICATIONS

Chen, Tianqi, and Carlos Guestrin. "Xgboost: A scalable tree boosting system." Proceedings of the 22nd acm sigkdd international conference on knowledge discovery and data mining. ACM, 2016. (Year: 2016).*

(Continued)

*Primary Examiner* — Miranda M Huang
*Assistant Examiner* — Kevin W Figueroa
(74) *Attorney, Agent, or Firm* — Bell & Manning, LLC

(57) ABSTRACT

A computing device compresses a gradient boosting tree predictive model. A gradient boosting tree predictive model is trained using a plurality of observation vectors. Each observation vector includes an explanatory variable value of an explanatory variable and a response variable value for a response variable. The gradient boosting tree predictive type model is trained to predict the response variable value of each observation vector based on a respective explanatory variable value of each observation vector. The trained gradient boosting tree predictive model is compressed using a compression model with a predefined penalty constant value and with a predefined array of coefficients to reduce a number of trees of the trained gradient boosting tree predictive model. The compression model minimizes a sparsity norm loss function. The compressed, trained gradient boosting tree predictive model is output for predicting a new response variable value from a new observation vector.

30 Claims, 20 Drawing Sheets

(56) References Cited

U.S. PATENT DOCUMENTS

| | | | |
|---|---|---|---|
| 2014/0280986 A1* | 9/2014 | Baulier | G06F 9/46 709/227 |
| 2017/0213280 A1 | 7/2017 | Kaznady | |
| 2017/0262770 A1 | 9/2017 | Purdy et al. | |
| 2017/0371856 A1 | 12/2017 | Can et al. | |
| 2018/0217991 A1 | 8/2018 | Dato et al. | |
| 2019/0164065 A1* | 5/2019 | Velji | G06N 5/02 |

OTHER PUBLICATIONS

Xu, Zhixiang, et al. "Gradient boosted feature selection." Proceedings of the 20th ACM SIGKDD international conference on Knowledge discovery and data mining. ACM, 2014. (Year: 2014).*

Friedman, Jerome, Trevor Hastie, and Robert Tibshirani. "A note on the group lasso and a sparse group lasso." arXiv preprint arXiv:1001.0736 (2010). (Year: 2010).*

Chen, Tianqi. "Introduction to boosted trees." University of Washington Computer Science 22 (2014): 115. (Year: 2014).*

Elith et al, A working guide to boosted regression trees. Journal of Animal Ecology, 77(4):802{813, Jul. 2008, pp. 802-813.

Steinberg et al., "Tree Ensembles: The Power of Post-Processing", Salford Systems, Dec. 2012, 22 pages.

Peng Zhao and Bin Yu. Boosted Lasso. Technical report, California Univ Berkeley Dept Ofstatistics, 2004, 22 pages.

CatBoost—open-source gradient boosting library, https://calboost.vandex/, printed Aug. 9, 2018, 7 pages.

CatBoost vs. Light GBM vs. XgBooost, https://towardsdatascience.com/catboost-vs-light-gbm-vs-xgboost-5f93620723db_printed_ Aug. 9, 2018, 19 pages.

Friedman et al., Discussion of boosting papers. Ann. Statist, 32:102-107, 2004.

Pan et al., Feature selection for ranking using boosted trees. In Proceedings of the 18th ACM conference on Information and knowledge management, pp. 2025-2028. ACM, 2009.

Vandewiele et al., "GENESIM: genetic extraction of a single, interpretable model," 30th Conference on Neural Information Processing Systems (NIPS 2016), Barcelona, Spain, 2016, 6 pages.

Xu et al. Gradient boosted feature selection. In Proceedings of the 20th ACM SIGKDD international conference on Knowledge discovery and data mining, pp. 522-531. ACM, 2014.

Jerome H Friedman. Greedy function approximation: a gradient boosting machine. Annals of statistics, vol. 29, No. 5, pp. 1189-1232, Oct. 2001.

Jerome H Friedman and Bogdan E Popescu, "Importance sampled learning ensembles" Journal of Machine Learning Research, pp. 1-32, Sep. 9, 2003.

Hars et al., Making Tree Ensembles Interpretable, 2016 ICML Workshop on Human Interpretability in Machine Learning, 2016, pp. 81-85.

Tianqi Chen and Carlos Guestrin. Xgboost: A scalable tree boosting system, In Proceedings of the $22^{nd}$ ACM KDD international conference on knowledge discovery and data mining, pp. 785-794. ACM, 2016.

Dorogush et al., CatBoost: gradient boosting with categorical features support, arXiv:1810.11363, Oct. 24, 2018, 7 pages.

Friedman et al., Predictive Learning via Rule Ensembles, arXiv:0811.1679, Oct. 5, 2005, 37 pages.

Gunes et al., Paper SAS-2017, Stacked Ensemble Models for Improved Prediction Accuracy, SAS Institute Inc., 19 pages, 2017.

Friedman et al., Chapter 10, Boosting and Additive Trees, The elements of statistical learning, vol. 1. Springer series in statistics New York, NY, USA:, 2001., 33 pages.

* cited by examiner

Algorithm 1 Gradient Boosting Tree

1: Initialize $h_0(x) = 0$
2: for $t = 1$ to $T$ do
3:    for $i=1,2,\ldots,N$ do Compute $$r_{it} = \left[\frac{\partial L(y_i, h_{t-1}(x_i))}{\partial h_{t-1}(x_i)}\right] \quad (3)$$

4:    end for
5:    Fit a regression tree to target $r_{it}$,
6:    giving the terminal regions $R_{jt}, j = 1, 2, \ldots, J_t$
7:    for $J = 1,2,3,\ldots, J_t$ do
8:      Compute $$\gamma_{jt} = \arg\min_{\gamma} \sum_{x_i \in R_{jt}} L(y_i, h_{t-1}(x_i) + \gamma) \quad (4)$$

9:    end for
10:   Update $h_t(x) = h_{t-1}(x) + \sum_{j=1}^{J_t} \gamma_{jt} I(x \in R_{jt})$
11: end for
12: Output $h_{final}(x) = h_T(x)$

FIG. 20

ANALYTIC SYSTEM FOR GRADIENT BOOSTING TREE COMPRESSION

CROSS-REFERENCE TO RELATED APPLICATIONS

The present application claims the benefit of and priority to 35 U.S.C. § 119(e) to U.S. Provisional Patent Application No. 62/701,224 filed on Jul. 20, 2018, and 35 U.S.C. § 119(e) to U.S. Provisional Patent Application No. 62/716,502 filed on Aug. 9, 2018, the entire contents of which are hereby incorporated by reference.

BACKGROUND

Machine learning and data driven analytics play an increasingly important role in real life application areas such as self-driving cars, face recognition, spam filters, fraud detection, machine monitoring, etc. Among the various classes of machine learning algorithms, the gradient boosting tree is outstanding for many practical new data set applications.

SUMMARY

In an example embodiment, a non-transitory computer-readable medium is provided having stored thereon computer-readable instructions that, when executed by a computing device, cause the computing device to compress a gradient boosting tree predictive model. A gradient boosting tree predictive model is trained using a plurality of observation vectors. Each observation vector includes an explanatory variable value of an explanatory variable and a response variable value for a response variable. The gradient boosting tree predictive type model is trained to predict the response variable value of each observation vector based on a respective explanatory variable value of each observation vector. The trained gradient boosting tree predictive model is compressed using a compression model with a predefined penalty constant value and with a predefined array of coefficients to reduce a number of trees of the trained gradient boosting tree predictive model. The compression model minimizes a sparsity norm loss function. The compressed, trained gradient boosting tree predictive model is output for predicting a new response variable value from a new observation vector.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to compress a gradient boosting tree predictive model.

In yet another example embodiment, a method of compressing a gradient boosting tree predictive model is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 20 depicts an an illustrative algorithm for computing a Gradient Boosting Tree in accordance with an illustrative embodiment.

DETAILED DESCRIPTION

During a predictive model training process, predictive models are trained using training data and/or validation data. Prediction errors for the trained models may be computed using validation data to decide when to terminate the training process. A gradient boosting tree predictive model builds trees to optimize a residual from previous trees. An ensemble of decision trees keeps improving a performance of the predictive model as the number of trees included becomes larger. A disadvantage of the gradient boosting tree predictive model is that it is difficult to interpret the model when a number of trees is large. For example, it is difficult to interpret a gradient boosting tree predictive model with 500 trees.

Figure 1:
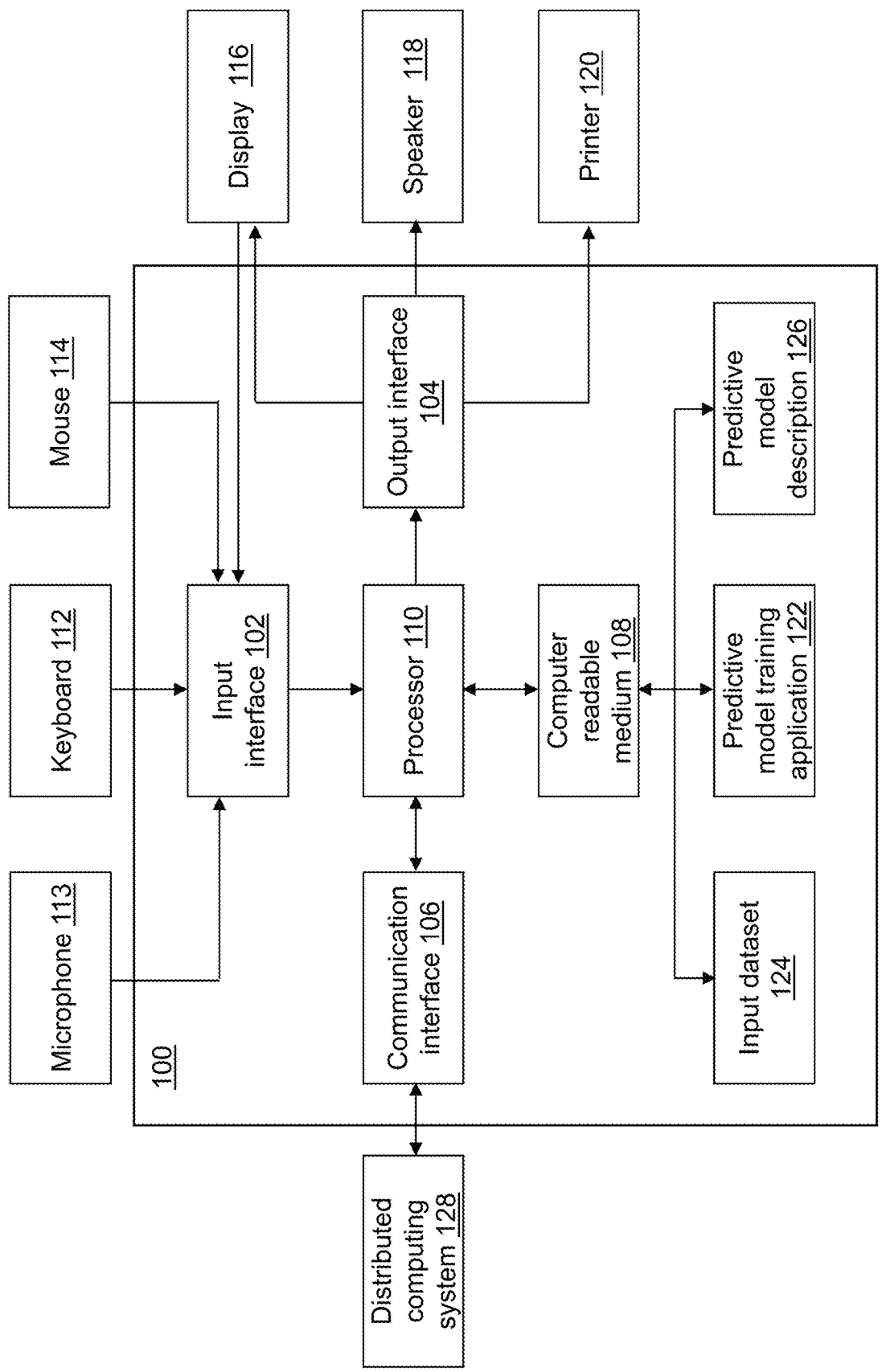
FIG. 1 depicts a block diagram of a predictive model training device in accordance with an illustrative embodiment.

Referring to FIG. 1, a block diagram of a predictive model training device 100 is shown in accordance with an illustrative embodiment that solves the interpretability problem discussed above using a traditional gradient boosting tree predictive model by compressing the defined trees while also improving a performance of the trained model and reducing an amount of memory and a computation time used. Predictive model training device 100 may include an input interface 102, an output interface 104, a communication interface 106, a non-transitory computer-readable medium 108, a processor 110, a predictive model training application 122, input dataset 124, and a predictive model description 126. Fewer, different, and/or additional components may be incorporated into predictive model training device 100.

Input interface 102 provides an interface for receiving information from the user or another device for entry into predictive model training device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into predictive model training device 100 or to make selections presented in a user interface displayed on display 116.

The same interface may support both input interface 102 and output interface 104. For example, display 116 comprising a touch screen provides a mechanism for user input and for presentation of output to the user. Predictive model training device 100 may have one or more input interfaces that use the same or a different input interface technology. The input interface technology further may be accessible by predictive model training device 100 through communication interface 106.

Output interface 104 provides an interface for outputting information for review by a user of predictive model training device 100 and/or for use by another application or device. For example, output interface 104 may interface with various output technologies including, but not limited to, display 116, a speaker 118, a printer 120, etc. Predictive model training device 100 may have one or more output interfaces that use the same or a different output interface technology. The output interface technology further may be accessible by predictive model training device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Predictive model training device 100 may have one or more communication interfaces that use the same or a different communication interface technology. For example, predictive model training device 100 may support communication using an Ethernet port, a Bluetooth antenna, a telephone jack, a USB port, etc. Data and/or messages may be transferred between predictive model training device 100 and another computing device of distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Predictive model training device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Predictive model training device 100 also may have one or more drives that support the loading of a memory media such as a CD, DVD, an external hard drive, etc. One or more external hard drives further may be connected to predictive model training device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Predictive model training device 100 may include a plurality of processors that use the same or a different processing technology.

Some machine-learning approaches may be more efficiently and speedily executed and processed with machine-learning specific processors (e.g., not a generic central processing unit (CPU)). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Predictive model training application 122 performs operations associated with defining predictive model description 126 from data stored in input dataset 124. Predictive model description 126 may be used to predict a response variable value for data stored in a second dataset 324 (shown referring to FIG. 3) or streamed to an event stream processing device 504 (shown referring to FIGS. 5 and 11). Some or all of the operations described herein may be embodied in predictive model training application 122. The operations may be implemented using hardware, firmware, software, or any combination of these methods.

Referring to the example embodiment of FIG. 1, predictive model training application 122 is implemented in software (comprised of computer-readable and/or computer-executable instructions) stored in computer-readable medium 108 and accessible by processor 110 for execution of the instructions that embody the operations of predictive model training application 122. Predictive model training application 122 may be written using one or more programming languages, assembly languages, scripting languages, etc. Predictive model training application 122 may be integrated with other analytic tools. As an example, predictive model training application 122 may be part of an integrated data analytics software application and/or software architecture such as that offered by SAS Institute Inc. of Cary, N.C., USA. Merely for illustration, predictive model training application 122 may be implemented using or integrated with one or more SAS software tools such as JMP®, Base SAS, SAS® Enterprise Miner™, SAS® Event Stream Processing, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services (CAS), SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Fraud Framework, SAS® Visual Investigator, SAS® VDMML, SAS® Model Studio all of which are developed and provided by SAS Institute Inc. of Cary, N.C., USA. Data mining, statistical analytics, and response prediction are practically applied in a wide variety of industries to solve technical problems.

Predictive model training application 122 may be implemented as a Web application. For example, predictive model training application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Input dataset 124 may include, for example, a plurality of rows and a plurality of columns. The plurality of rows may be referred to as observation vectors or records (observations), and the columns may be referred to as variables. In an alternative embodiment, input dataset 124 may be transposed. The plurality of variables may include a response variable and one or more explanatory variables that define an explanatory vector X for each observation vector. Input dataset 124 may include additional variables that are not the response variable or one of the explanatory variables. An observation vector is defined as $(y_i, x_i)$ that may include the response variable value $y_i$ and the explanatory variable values $x_i$ associated with each observation vector i, where i=1, 2, . . . , N, where N is the number of observation vectors included in input dataset 124. One or more variables of the plurality of variables may describe a characteristic of a physical object. For example, if input dataset 124 includes data related to operation of a vehicle, the variables may include a type of vehicle, an oil pressure, a speed, a gear indicator, a gas tank level, a tire pressure for each tire, an engine temperature, a radiator level, etc.

In data science, engineering, and statistical applications, data often consists of multiple measurements (across sensors, characteristics, responses, etc.) collected across multiple time instances (patients, test subjects, etc.). These measurements may be collected in input dataset 124 for analysis and processing or streamed to predictive model training device 100 as it is generated. Input dataset 124 may include data captured as a function of time for one or more physical objects. The data stored in input dataset 124 may be captured at different time points periodically, intermittently, when an event occurs, etc. Input dataset 124 may include data captured at a high data rate such as 200 or more observation vectors per second for one or more physical objects. One or more columns of input dataset 124 may include a time and/or date value. Input dataset 124 may include data captured under normal and abnormal operating conditions of the physical object.

The data stored in input dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. For example, data stored in input dataset 124 may be generated as part of the Internet of Things (IoT), where things (e.g., machines, devices, phones, sensors) can be connected to networks and the data from these things collected and processed within the things and/or external to the things before being stored in input dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in input dataset 124.

The data stored in input dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

Input dataset 124 may be stored on computer-readable medium 108 or on one or more computer-readable media of distributed computing system 128 and accessed by predictive model training device 100 using communication interface 106, input interface 102, and/or output interface 104. Input dataset 124 may be stored in various compressed formats such as a coordinate format, a compressed sparse column format, a compressed sparse row format, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

Input dataset 124 may be stored using various data structures as known to those skilled in the art including one or more files of a file system, a relational database, one or more tables of a system of tables, a structured query language database, etc. on predictive model training device 100 or on distributed computing system 128. Predictive model training device 100 may coordinate access to input dataset 124 that is distributed across distributed computing system 128 that may include one or more computing devices. For example, input dataset 124 may be stored in a cube distributed across a grid of computers as understood by a person of skill in the art. As another example, input dataset 124 may be stored in a multi-node Hadoop® cluster. For instance, Apache™ Hadoop® is an open-source software framework for distributed computing supported by the Apache Software Foundation. As another example, input dataset 124 may be stored in a cloud of computers and accessed using cloud computing technologies, as understood by a person of skill in the art. The SAS® LASR™ Analytic Server may be used as an analytic platform to enable multiple users to concurrently access data stored in input dataset 124. The SAS Viya open, cloud-ready, in-memory architecture also may be used as an analytic platform to enable multiple users to concurrently access data stored in input dataset 124. SAS CAS may be used as an analytic server with associated cloud services in SAS Viya. Some systems may use SAS In-Memory Statistics for Hadoop® to read big data once and analyze it several times by persisting it in-memory for the entire session. Some systems may be of other types and configurations.

Figure 2:
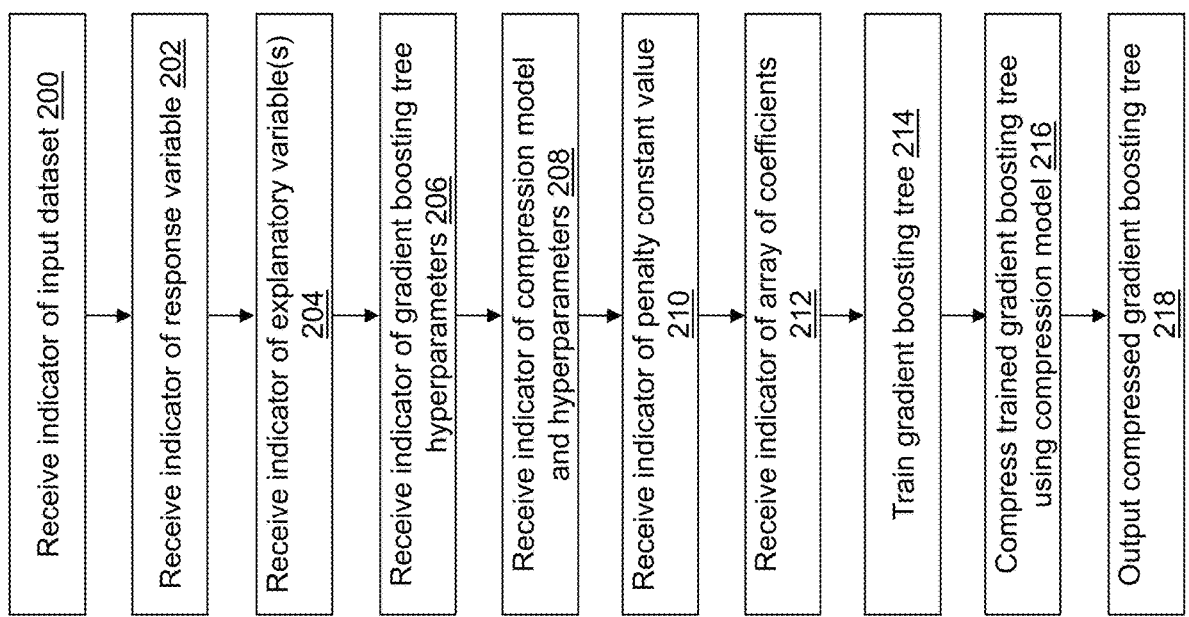
FIG. 2 depicts a flow diagram illustrating examples of operations performed by a predictive model training application of the predictive model training device of FIG. 1 in accordance with an illustrative embodiment.

Referring to FIG. 2, example operations associated with predictive model training application 122 are described. Additional, fewer, or different operations may be performed depending on the embodiment of predictive model training application 122. The order of presentation of the operations of FIG. 2 is not intended to be limiting. Some of the operations may not be performed in some embodiments. Although some of the operational flows are presented in sequence, the various operations may be performed in various repetitions, concurrently (in parallel, for example, using threads and/or distributed computing system 128), and/or in other orders than those that are illustrated. For example, a user may execute predictive model training application 122, which causes presentation of a first user interface window, which may include a plurality of menus and selectors such as drop-down menus, buttons, text boxes, hyperlinks, etc. associated with predictive model training application 122 as understood by a person of skill in the art. The plurality of menus and selectors may be accessed in various orders. An indicator may indicate one or more user trainings from a user interface, one or more data entries into a data field of the user interface, one or more data items read from computer-readable medium 108 or otherwise defined with one or more default values, etc. that are received as an input by predictive model training application 122.

Referring to FIG. 2, in an operation 200, a first indicator may be received that indicates input dataset 124. For example, the first indicator indicates a location and a name of input dataset 124. As an example, the first indicator may be received by predictive model training application 122 after selection from a user interface window or after entry by a user into a user interface window. In an alternative embodiment, input dataset 124 may not be selectable. For example, a most recently created dataset may be used automatically.

In an operation 202, a second indicator may be received that indicates response variable y in input dataset 124. For example, the second indicator may indicate a column number or a column name. As another option, a first or a last column of input dataset 124 may be assumed to be the response variable y column.

In an operation 204, a third indicator may be received that indicates one or more explanatory variables v in input dataset 124. For example, the third indicator may indicate one or more column numbers or one or more column names. As another option, all of the columns of input dataset 124 except a first or a last column may be assumed to be the explanatory variables. As understood by a person of skill in the art, when the third indicator indicates a plurality of explanatory variables, v defines an explanatory variable vector v.

In an operation 206, a fourth indicator may be received that indicates hyperparameter values for a gradient boosting tree predictive model. The gradient boosting tree predictive model predicts a value for Y given explanatory variable X. The gradient boosting tree predictive model creates a predictive model that consists of multiple decision trees by fitting a set of additive decision trees. Hyperparameters define values or various options that may govern a training process and/or govern operation of the trained model. The gradient boosting tree predictive model hyperparameters may include an L1 norm regularization parameter, a learning rate for each tree, a number of trees to grow, an L2 norm regularization parameter, a fraction of the training data to be used for growing each tree, a number of input variables to consider splitting on in a node, a maximum number of splits per node, a maximum tree depth, a minimum number of observation vectors per leaf, etc.

For illustration, a gradient boosting tree predictive model can be trained using the GRADBOOST procedure implemented by SAS Visual Data Mining and Machine Learning software. The fourth indicator may include specified values for one or more of the hyperparameters and/or specified values for an automatic tuning process. The default values of these hyperparameters may not be suitable for all applications. To reduce the effort in tuning these hyperparameters, the automatic tuning process may be used to identify the best settings for the hyperparameters though the hyperparameters may optionally instead be selected as an input option by the user using the fourth indicator. An optimization algorithm of the automatic tuning process searches for a best possible combination of values of the hyperparameters while trying to minimize an objective function. The objective function is a validation error estimate (e.g., misclassification error for nominal targets or average square error for interval targets). The automatic tuning process includes multiple iterations with each iteration typically involving multiple objective function evaluations.

When the automatic tuning process is selected for creating the gradient boosting tree predictive model, the gradient boosting tree model that includes multiple decision trees is tuned for minimum error as measured by a specified objective function. One or more values of the L1 norm regularization parameter, one or more values of the learning rate for each tree, one or more values of the number of trees to grow, one or more values of the L2 norm regularization parameter, one or more values of the fraction of the training data to be used for growing each tree, one or more values of the number of input variables to consider splitting on in a node, one or more values of the maximum number of splits per node, one or more values of the maximum tree depth, one or more values of the minimum number of observation vectors per leaf, etc. may be specified. The one or more values may be defined as a single value, as a list of possible values to evaluate, as a range of values to evaluate between a minimum value and a maximum value using an iteration value, etc. For illustration, a tuneGradientBoostTree action selects different hyperparameter configurations to run a gbtreeTrain action and a gbtreeScore action multiple times to train and validate gradient boosting tree models as it searches for a model that has reduced validation error. The gbtreeTrain action and the gbtreeScore action are included in the decisionTree action set of SAS Viya and SAS CAS.

In an operation 208, a fifth indicator of a compression model may be received. The fifth indicator may be received by predictive model training application 122 after selection from a user interface window or after entry by a user into a user interface window. As an example, the compression model may be selected from "Lasso", "Ridge", "Elastic Net", etc. Of course, the compression model may be labeled or selected in a variety of different manners by the user as understood by a person of skill in the art. In an alternative embodiment, the compression model may not be selectable, and a single compression model is implemented in predictive model training application 122. Selection of the Lasso (least absolute shrinkage and selection operator) compression model indicates selection of a L1-norm regression. Selection of the Ridge compression model indicates selection of a L2-norm regression. Selection of the Elastic Net compression model indicates selection of a combination of the L1-norm and the L2-norm regression.

In an operation 210, a sixth indicator of a value of a penalty constant value may be received. In an alternative embodiment, the sixth indicator may not be received. For example, a default value may be stored, for example, in computer-readable medium 108 and used automatically. In another alternative embodiment, the value of the penalty constant value $\lambda$ may not be selectable. Instead, a fixed, predefined value may be used. For illustration, a default value of the penalty constant value $\lambda$ may be 0.1, and a range may be from 1.0E−10 to 1.0E8.

In an operation 212, a seventh indicator of an array of coefficient values may be received. In an alternative embodiment, the seventh indicator may not be received. For example, default values may be stored, for example, in computer-readable medium 108 and used automatically. In another alternative embodiment, the values of the array of coefficient values $\beta$ may not be selectable. Instead, fixed, predefined values may be used. For illustration, default values of the array of coefficient values $\beta$ may be one for all trees, which means no compression at all initially. The array of coefficient values $\beta$ may be computed by solving the compression problem In an operation 214, the gradient boosting tree predictive model is trained using the observation vectors stored in input dataset 124 and the hyperparameters defined in operation 206. A first tree estimates the response variable value y with the original features defined by the one or more explanatory variable values x. A residual from the first tree is used as input to a second tree. The process is continued until a stopping criterion is satisfied. The prediction results are summed to define the trained gradient boosting tree predictive model where the created series of decision trees together form a single predictive model. For example, the trees can be described using $h_{final}(x) = h_T(x) = \Sigma_{i=1}^{T} h_i(x)$, where T is a number of trees included in the trained gradient boosting tree model, and h indicates a weak classifier. Again, an observation vector is defined as $(y_i, x_i)$, where i=1, 2, . . . , N, where N is a number of observation vectors included in the training dataset that may include a value for the response variable $y_i$ and for the explanatory variable vector $x_i$ associated with the observation vector i.

For illustration, the SAS procedure GRADBOOST computes fit statistics on a per-tree basis as the decision trees are built sequentially. Each tree uses a subsample of input dataset 124. A decision tree in a gradient boosting model trains on new training data derived from the original training data stored in input dataset 124. Using different data to train different trees during the boosting process reduces a correlation between the predictions of the trees, which in turn improves the predictions that result when using the gradient boosting tree predictive model. The GRADBOOST procedure samples the original data without replacement to create the training data for an individual tree. The GRADBOOST procedure performs the action of sampling multiple times throughout the training process, and each set of training data created may be referred to as a subsample. The GRADBOOST procedure trains a decision tree by splitting the subsampled data, then splitting each resulting segment, and so on recursively until some constraint is met. Splitting involves performing the following tasks in order: 1. selecting candidate inputs, 2. computing the association of each input explanatory vector with the response value also referred to as a target value, and 3. searching for a best split that uses a most highly associated input. The split search seeks to maximize a reduction in a gain for a nominal response variable type and a reduction in variance of an interval response variable type. As previously discussed, the gradient boosting tree predictive model may use the automatic tuning process or a cross-validation process with the hyperparameter values defined in operation 206. For illustration, Algorithm 1 shown in FIG. 20 summarizes a gradient boosting tree training process where L is a loss function.

In an operation 216, the decision trees of the trained gradient boosting tree model are compressed using the compression model to reduce a number of decision trees included in trained gradient boosting tree model by picking important trees for a final compressed model. For notation purposes, for t=1, 2, ..., T, $$f_t(x) = \sum_{j=1}^{J_t} \gamma_{jt} I(x \in R_{jt}) = h_t(x) - h_{t-1}(x)$$

and let $g_1(x), g_2(x), \ldots, g_d(x)$ represent general functions on the original explanatory variables 1, 2, ..., d, where d is a number of the explanatory variables that define explanatory variable vector $x_i$. $f_t(x)$ is a difference between a prediction score from tree t and a prediction result from a previous tree t−1. The general functions can be any function. For example, if $g_1(x)=x_1$, a first feature is plugged back into the model and $g_2(x)=x_1*x_2$, suggests a correlation term. The trained gradient boosting tree model is compressed by solving the following optimization problem $$\min_{\beta} \frac{1}{N} \sum_{i=1}^{N} L\left(Y_i, \beta_0 \sum_{k=1}^{T} \beta_k f_k(x_i) + \sum_{p=1}^{d} \beta_{T+p} g_p(x_i)\right) + \lambda \|\beta\|$$

where L is the loss function, and $\beta_0 + \Sigma_{k+1}^T \beta_k f_k(x_i) + \Sigma_{p=1}^d \beta_{T+p} g_p(x_i)$ is the final prediction value for $y_i$. The loss function can be any sparsity norm such as an L1 norm, an L2 norm, an Lp norm, where p can have any value, etc.

The original features are transformed into a generalized linear model where the transformation stands for the information in the original features that have not been "squeezed out" by the gradient boosting tree model. The original gradient boosting tree with post processing can only obtain information that can be contained in a typical tree model. However, the described approach not only uses a tree model, but also combines a generalized linear model by adding more terms $g_p(x_i)$ to enlarge a class of functions that the compressed gradient boosting tree model can measure. To explain how to interpret the minimization result, consider a LASSO regression model with an L1 norm loss function. If the solution is not sparse, the L1 norm term can be very large meaning it is not the optimal solution. As long as the optimization above is solved, the output weight should be sparse with a lot of zeroes meaning the LASSO regression model is not trying all of the combinations of defined trees since that costs too much computing time.

In an operation 218, the parameters that describe the compressed gradient boosting tree model may be stored in computer-readable medium 108. For example, the parameters that describe the compressed gradient boosting tree model may be stored in predictive model description 126. In an illustrative embodiment, an ASTORE procedure implemented by SAS Visual Data Mining and Machine Learning software stores the compressed gradient boosting tree model in a binary file. For example, a savestate statement may be executed to save the compressed gradient boosting tree model in predictive model description 126.

Figure 3:
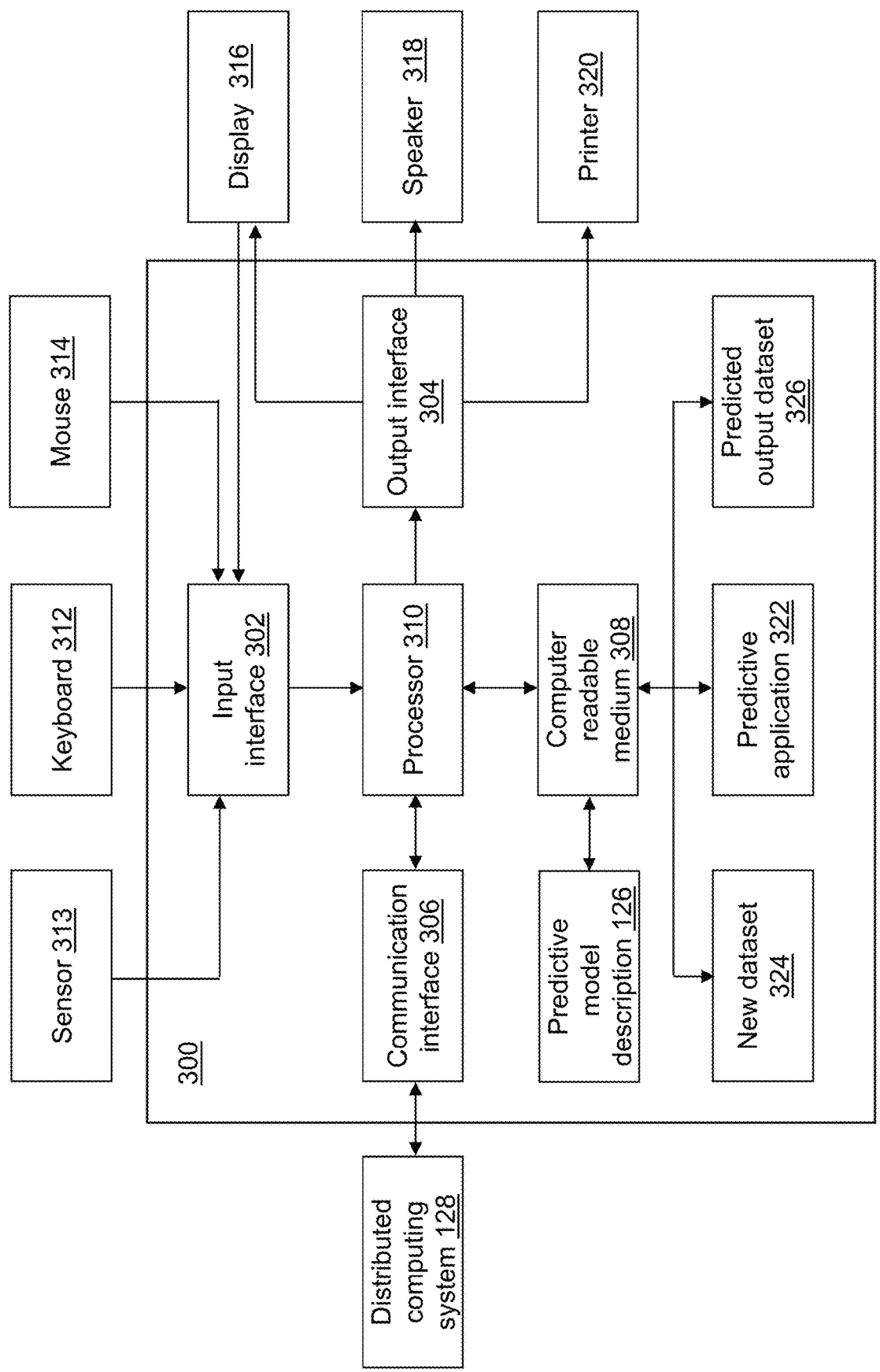
FIG. 3 depicts a block diagram of a prediction device that uses a trained predictive model to predict a result in accordance with an illustrative embodiment.

Referring to FIG. 3, a block diagram of a prediction device 300 is shown in accordance with an illustrative embodiment. Prediction device 300 may include a second input interface 302, a second output interface 304, a second communication interface 306, a second non-transitory computer-readable medium 308, a second processor 310, a predictive application 322, predictive model description 126, a second dataset 324, and predicted output dataset 326. Fewer, different, and/or additional components may be incorporated into prediction device 300. Prediction device 300 and predictive model training device 100 may be the same or different devices.

Second input interface 302 provides the same or similar functionality as that described with reference to input interface 102 of predictive model training device 100 though referring to prediction device 300. Second output interface 304 provides the same or similar functionality as that described with reference to output interface 104 of predictive model training device 100 though referring to prediction device 300. Second communication interface 306 provides the same or similar functionality as that described with reference to communication interface 106 of predictive model training device 100 though referring to prediction device 300. Data and messages may be transferred between prediction device 300 and distributed computing system 128 using second communication interface 306. Second computer-readable medium 308 provides the same or similar functionality as that described with reference to computer-readable medium 108 of predictive model training device 100 though referring to prediction device 300. Second processor 310 provides the same or similar functionality as that described with reference to processor 110 of predictive model training device 100 though referring to prediction device 300.

Predictive application 322 performs operations associated with predicting values for the response variable using predictive model description 126 based on values for the explanatory variables v stored in second dataset 324. Dependent on the type of data stored in input dataset 124 and second dataset 324, predictive application 322 may identify anomalies as part of process control, for example, of a manufacturing process, classify images, for example, those produced by an electro-cardiogram device, identify a fraudulent transaction, identify a health alert, for example, of a patient using health sensors, identify a cybersecurity attack using network traffic, etc. Some or all of the operations described herein may be embodied in predictive application 322. The operations may be implemented using hardware, firmware, software, or any combination of these methods.

Referring to the example embodiment of FIG. 3, predictive application 322 is implemented in software (comprised of computer-readable and/or computer-executable instructions) stored in second computer-readable medium 308 and accessible by second processor 310 for execution of the instructions that embody the operations of predictive application 322. Predictive application 322 may be written using one or more programming languages, assembly languages, scripting languages, etc. Predictive application 322 may be integrated with other analytic tools. For example, predictive application 322 may be implemented using or integrated with one or more SAS software tools such as JMP, Base SAS, SAS/STAT, of SAS Enterprise Miner SAS® High Performance Analytics Server, SAS LASR, SAS In-Database Products, SAS Scalable Performance Data Engine, SAS/OR, SAS/ETS, SAS Inventory Optimization, SAS Inventory Optimization Workbench, SAS Visual Analytics, SAS Viya, SAS In-Memory Statistics for Hadoop, SAS Forecast Server, all of which are developed and provided by SAS Institute Inc. of Cary, N.C., USA. One or more operations of predictive application 322 further may be performed by an ESPE. Predictive application 322 and predictive model training application 122 further may be integrated applications.

Predictive application 322 may be implemented as a Web application. Predictive application 322 may be integrated with other system processing tools to automatically process data generated as part of operation of an enterprise using second input interface 302, second output interface 304, and/or second communication interface 306 so that appropriate action can be initiated in response. For example, a warning or an alert may be presented using a second display 316, a second speaker 318, a second printer 620, etc. or sent to one or more computer-readable media, display, speaker, printer, etc. of distributed computing system 128 based on predicted values for the response variable.

Input dataset 124 and second dataset 324 may be generated, stored, and accessed using the same or different mechanisms. Similar to input dataset 124, second dataset 324 may include a plurality of rows and a plurality of columns with the plurality of rows referred to as observation vectors or records, and the columns referred to as variables that are associated with an observation. Second dataset 324 may be transposed.

Similar to input dataset 124, second dataset 324 may be stored on second computer-readable medium 308 or on one or more computer-readable media of distributed computing system 128 and accessed by prediction device 300 using second communication interface 306. Data stored in second dataset 324 may be a sensor measurement or a data communication value, for example, from a sensor 313, may be generated or captured in response to occurrence of an event or a transaction, generated by a device such as in response to an interaction by a user with the device, for example, from a second keyboard 312 or a second mouse 314, etc. The data stored in second dataset 324 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in second dataset 324 may be captured at different time points periodically, intermittently, when an event occurs, etc. One or more columns may include a time value. Similar to input dataset 124, data stored in second dataset 324 may be generated as part of the IoT, and some or all data may be pre- or post-processed by an ESPE.

Similar to input dataset 124, second dataset 324 may be stored in various compressed formats such as a coordinate format, a compressed sparse column format, a compressed sparse row format, etc. Second dataset 324 further may be stored using various structures as known to those skilled in the art including a file system, a relational database, a system of tables, a structured query language database, etc. on predictive model training device 100, on prediction device 300, and/or on distributed computing system 128. Prediction device 300 and/or distributed computing system 128 may coordinate access to second dataset 324 that is distributed across a plurality of computing devices. For example, second dataset 324 may be stored in a cube distributed across a grid of computers as understood by a person of skill in the art. As another example, second dataset 324 may be stored in a multi-node Hadoop cluster. As another example, second dataset 324 may be stored in a cloud of computers and accessed using cloud computing technologies, as understood by a person of skill in the art. The SAS LASR Analytic Server and/or SAS Viya may be used as an analytic platform to enable multiple users to concurrently access data stored in second dataset 324.

Figure 4:
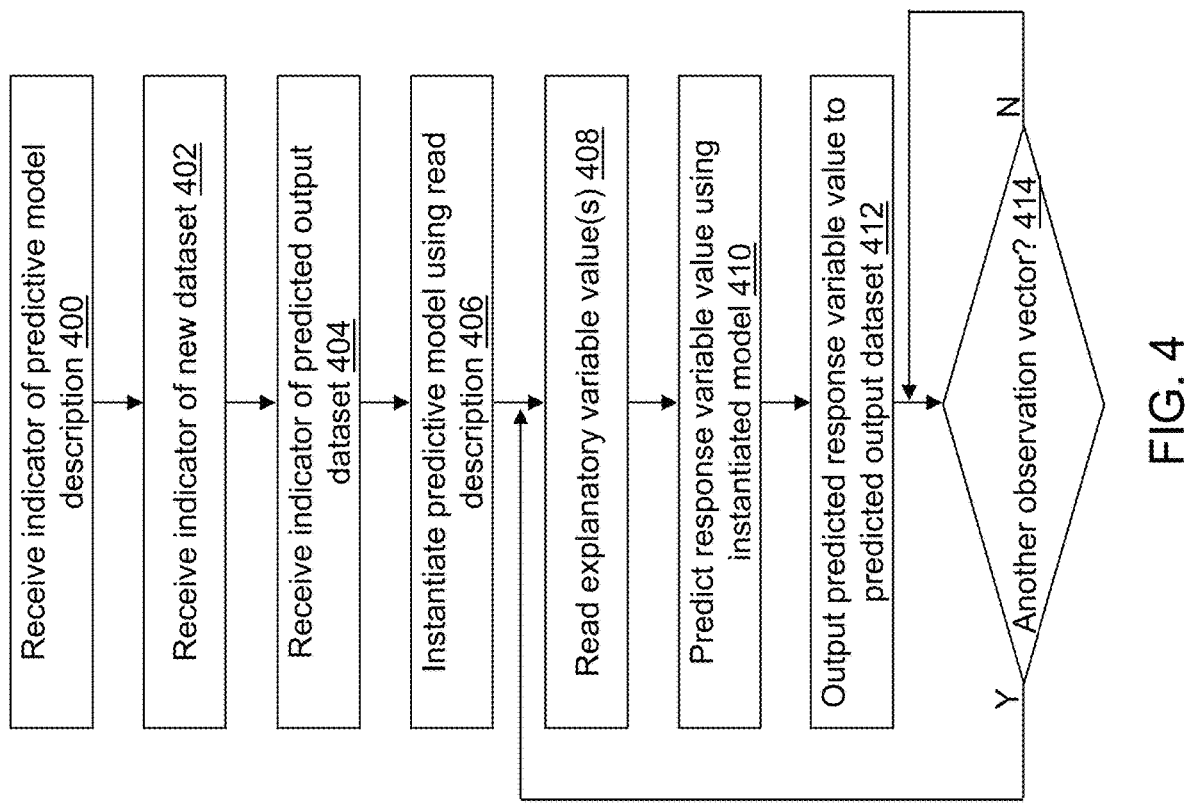
FIG. 4 depicts a flow diagram illustrating examples of operations performed by the prediction device of FIG. 3 in accordance with an illustrative embodiment.

Referring to FIG. 4, example operations of predictive application 322 are described. Additional, fewer, or different operations may be performed depending on the embodiment of predictive application 322. The order of presentation of the operations of FIG. 4 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 400, an eighth indicator may be received that indicates predictive model description 126. For example, the eighth indicator indicates a location and a name of predictive model description 126. As an example, the eighth indicator may be received by predictive application 322 after training from a user interface window or after entry by a user into a user interface window. In an alternative embodiment, predictive model description 126 may not be selectable. For example, a most recently created predictive model description may be used automatically.

In an operation 402, a ninth indicator may be received that indicates second dataset 324. For example, the ninth indicator indicates a location and a name of second dataset 324. As an example, the ninth indicator may be received by predictive application 322 after training from a user interface window or after entry by a user into a user interface window. In an alternative embodiment, second dataset 324 may not be selectable. For example, a most recently created dataset may be used automatically.

In an operation 404, a tenth indicator may be received that indicates predicted output dataset 326. For example, the fifteenth indicator indicates a location and a name of predicted output dataset 326. As an example, the fifteenth indicator may be received by predictive application 322 after training from a user interface window or after entry by a user into a user interface window. In an alternative embodiment, predicted output dataset 326 may not be selectable. For example, a default name and location for predicted output dataset 326 may be used automatically.

In an operation 406, a predictive model is instantiated based on the predictive model description read from predictive model description 126. For example, the compressed gradient boosting model may be instantiated using the ASTORE procedure, for example, as described in U.S. Pat. No. 9,619,491.

In an operation 408, a value(s) x for the explanatory variable is read from a next line of second dataset 324 or optionally is received from an ESPE.

In an operation 410, a predicted value y for the response variable is predicted using the instantiated predictive model and the read value(s) x.

In an operation 412, the predicted value y for the response variable is output to predicted output dataset 326. The read value(s) x and/or other values read from second dataset 324 further may be output to predicted output dataset 326. The predicted value y may be output using a second display 316, a second speaker 318, a second printer 320, or may be output to another device using distributed computing system 128. For example, an alert message may be sent to a smart phone.

In an operation 414, a determination is made concerning whether there is another observation vector to process. When there is another observation vector to process, processing continues in operation 408. When there is not another observation vector to process, processing continues in operation 414 to wait for receipt of another observation vector, for example, from an ESPE, or processing is done.

A compressed gradient boosting tree model was created by predictive model training application 122 and instantiated by predictive application 322 using various data as input dataset 124/second dataset 324 and compared to a traditional gradient boosting tree model that was created using the GRADBOOST procedure. $g_p(x)=x$ was used for all p.

Figure 13:
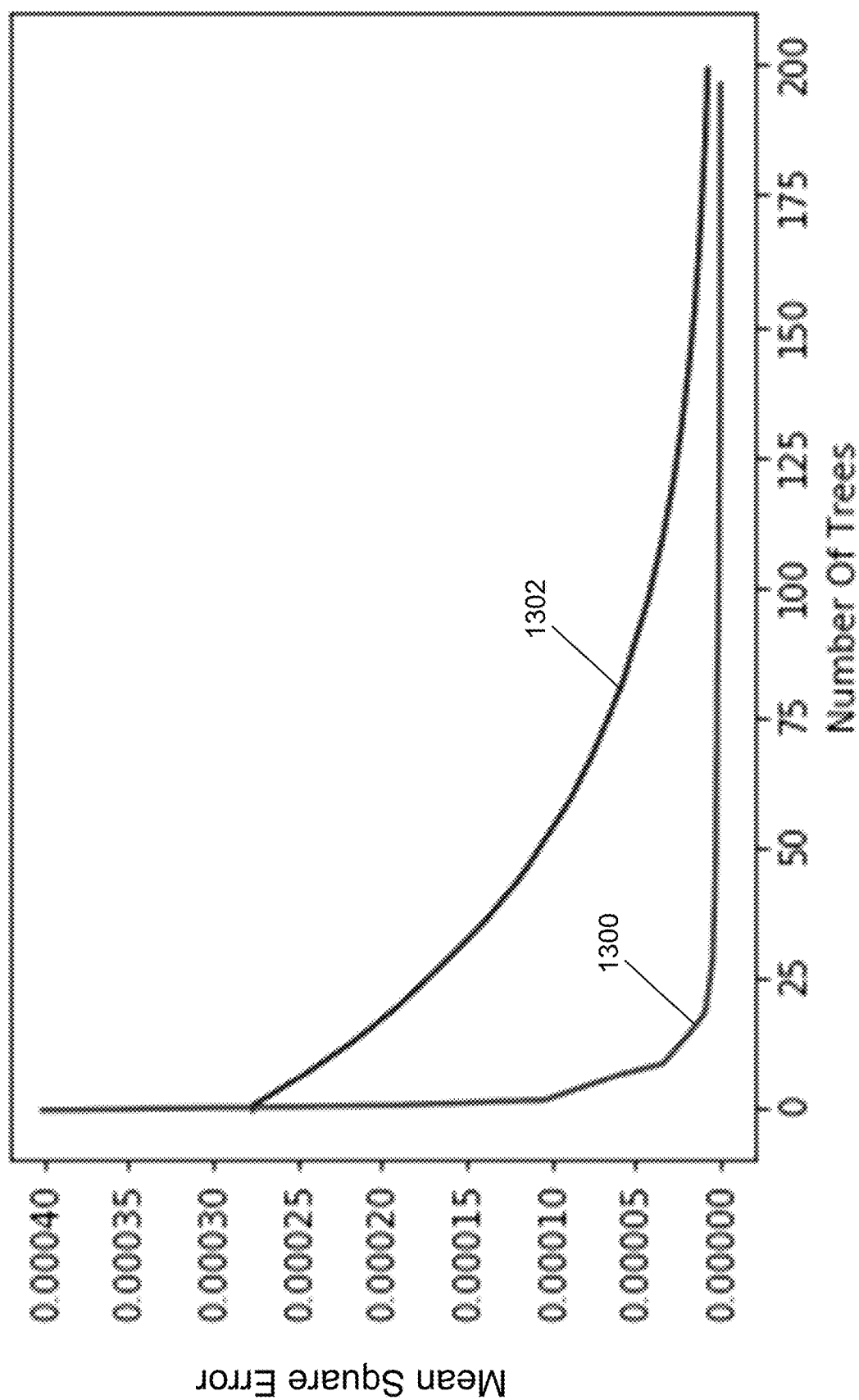
FIG. 13 depicts an error comparison between a traditional gradient boosting tree model and a compressed gradient boosting tree model created using the operations of FIG. 2 using a first input dataset in accordance with an illustrative embodiment.

Referring to FIG. 13, a first curve 1300 and a second curve 1302 show comparative results for a first input dataset that included 252 observations and 14 features. 33% of the observations were treated as testing data to generate the mean square error data shown. First curve 1300 shows a mean square error as a function of a number of trees included in the compressed gradient boosting tree model. Second curve 1302 shows a mean square error as a function of a number of trees included in the traditional gradient boosting tree model. To reach the same performance as the traditional gradient boosting tree with 200 trees, the compressed model needed only approximately 15 trees. As a result, less memory is used, faster predictions can be computed, and the results are more interpretable and are improved because there is less error.

Figure 14:
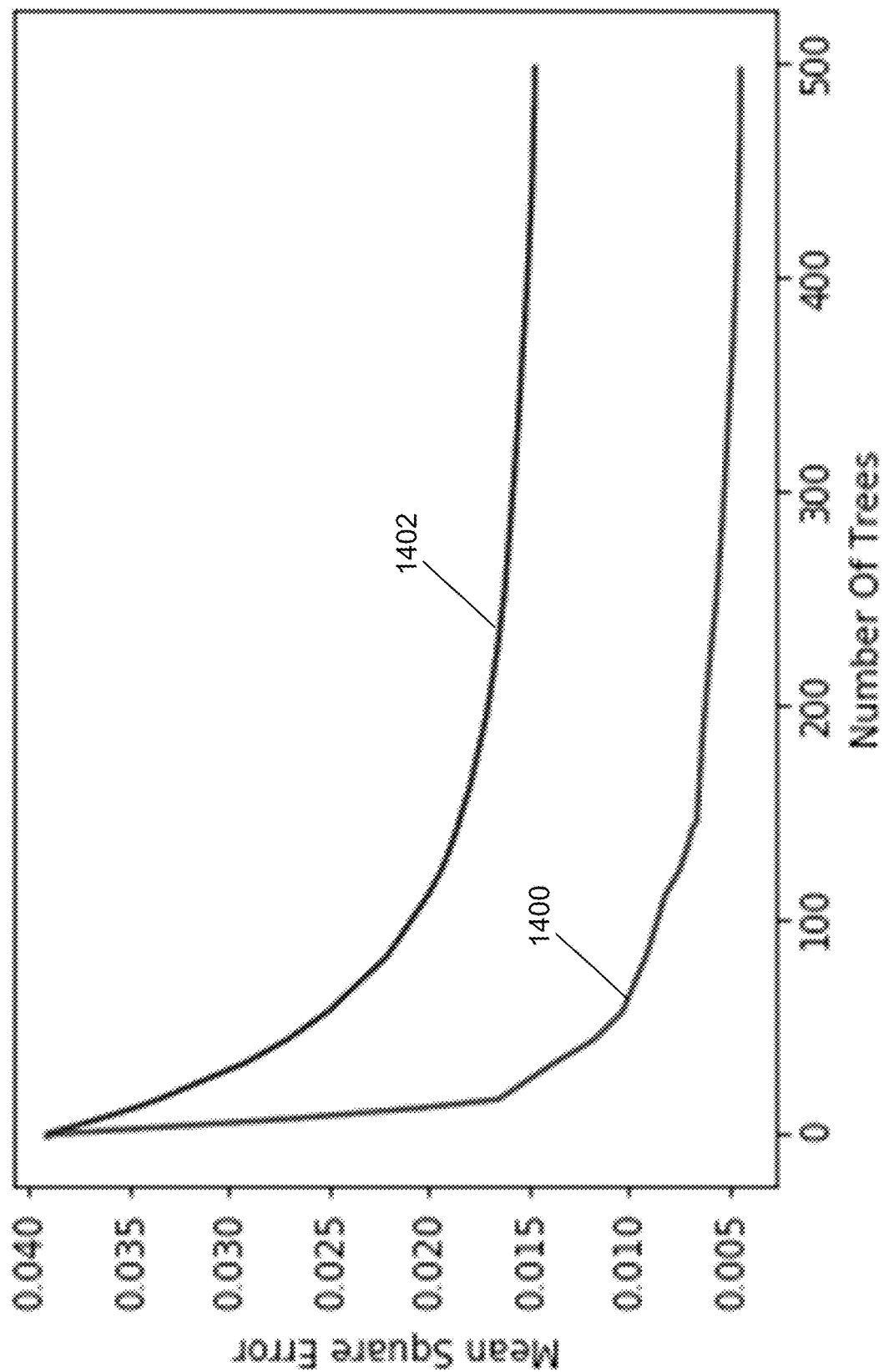
FIG. 14 depicts an error comparison between a traditional gradient boosting tree model and a compressed gradient boosting tree model created using the operations of FIG. 2 using a second input dataset in accordance with an illustrative embodiment.

Referring to FIG. 14, a third curve 1400 and a fourth curve 1402 show comparative results for a second input dataset that included 3107 observations and 6 features. 33% of the observations were treated as testing data to generate the mean square error data shown. Third curve 1400 shows a mean square error as a function of a number of trees included in the compressed gradient boosting tree model. Fourth curve 1402 shows a mean square error as a function of a number of trees included in the traditional gradient boosting tree model. To reach the same performance as the traditional gradient boosting tree with 500 trees, the compressed model needed only approximately 10 trees. As a result, less memory is used, faster predictions can be computed, and the results are more interpretable and are improved because there is less error.

Figure 15:
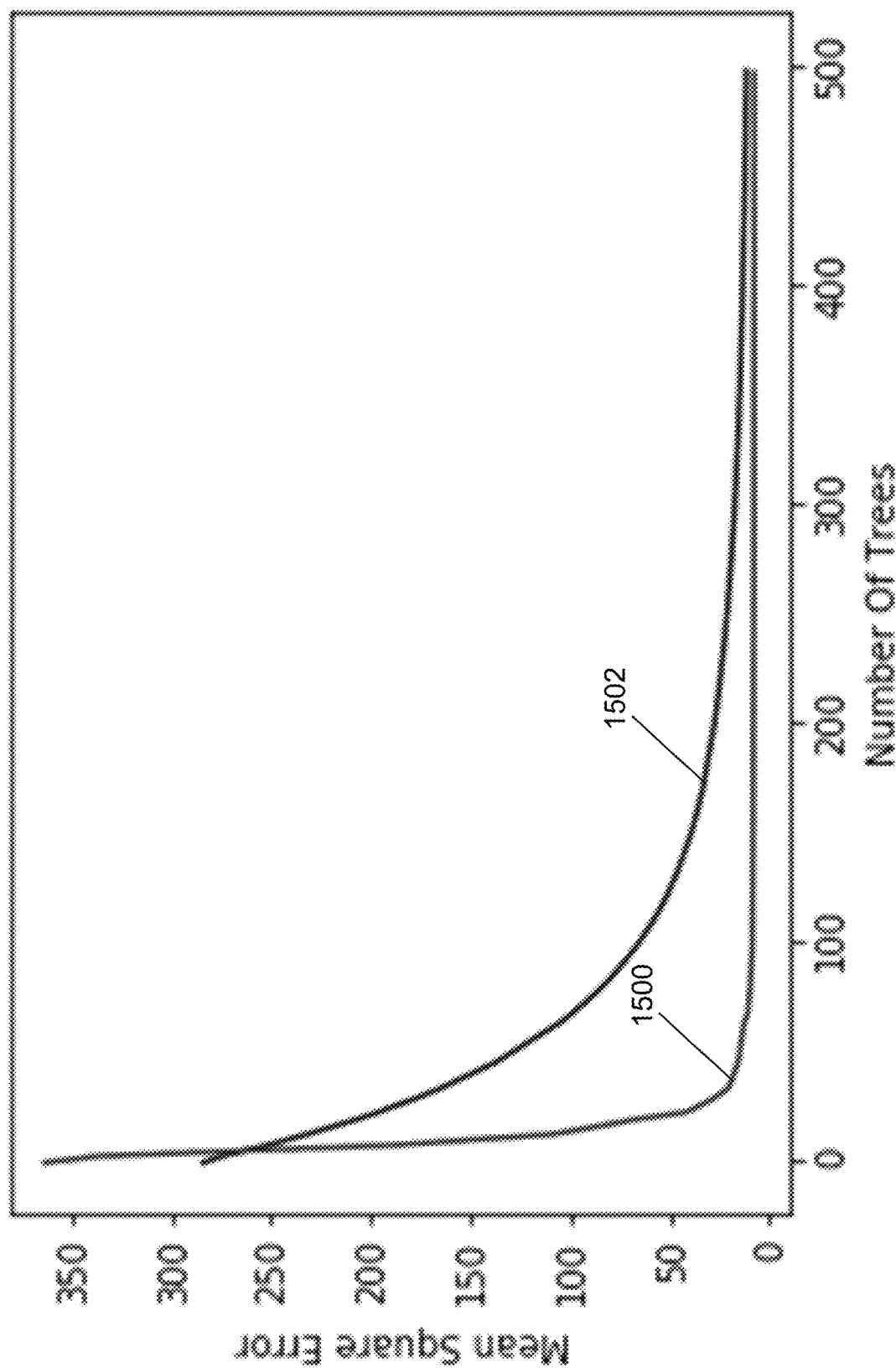
FIG. 15 depicts an error comparison between a traditional gradient boosting tree model and a compressed gradient boosting tree model created using the operations of FIG. 2 using a third input dataset in accordance with an illustrative embodiment.

Referring to FIG. 15, a fifth curve 1500 and a sixth curve 1502 show comparative results for a third input dataset that included 8192 observations and 12 features. 33% of the observations were treated as testing data to generate the mean square error data shown. Fifth curve 1500 shows a mean square error as a function of a number of trees included in the compressed gradient boosting tree model. Sixth curve 1502 shows a mean square error as a function of a number of trees included in the traditional gradient boosting tree model. To reach the same performance as the traditional gradient boosting tree with 500 trees, the compressed model needed only approximately 20 trees. As a result, less memory is used, faster predictions can be computed, and the results are more interpretable and are improved because there is less error.

Figure 16:
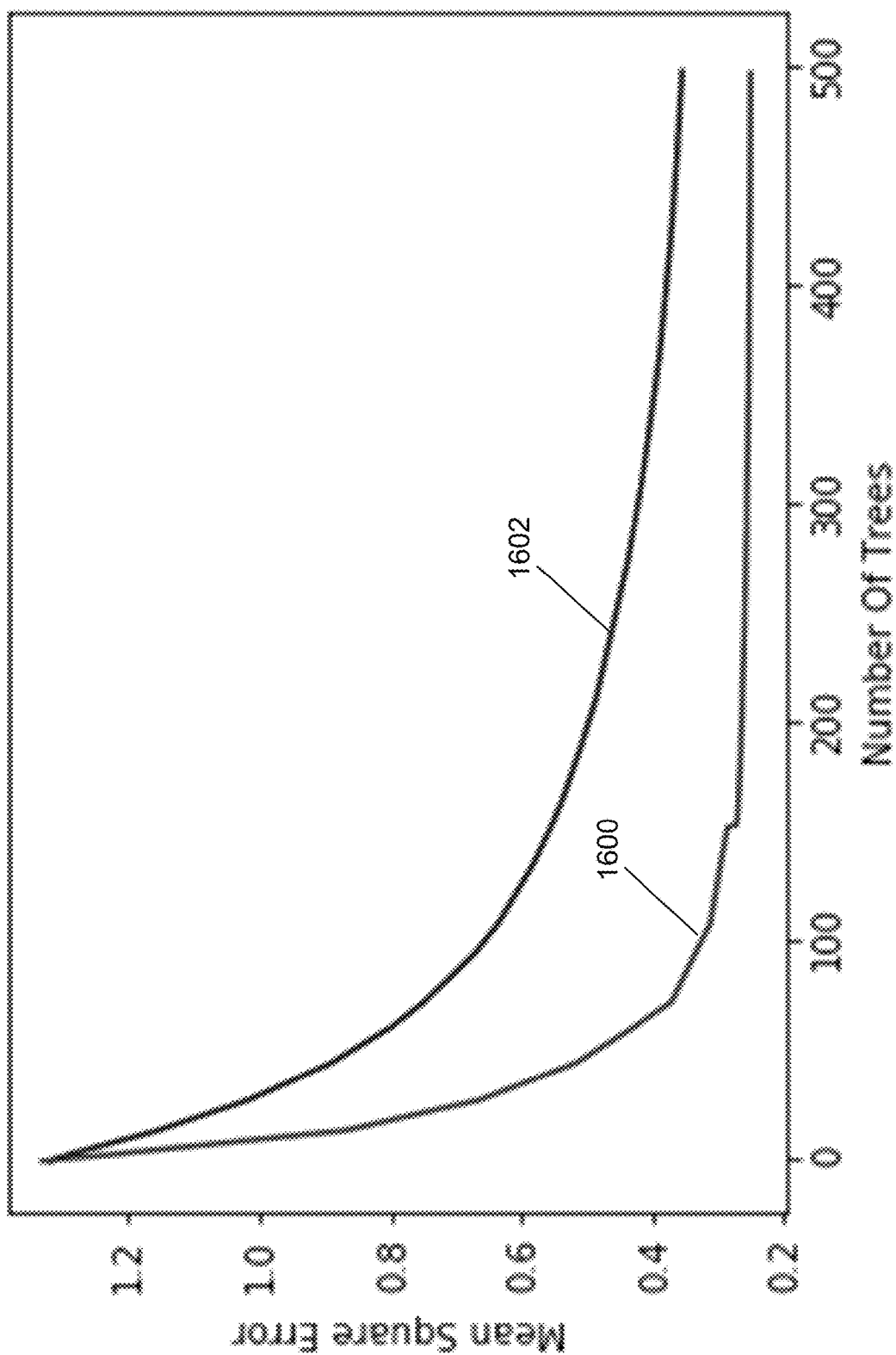
FIG. 16 depicts an error comparison between a traditional gradient boosting tree model and a compressed gradient boosting tree model created using the operations of FIG. 2 using a fourth input dataset in accordance with an illustrative embodiment.

Referring to FIG. 16, a seventh curve 1600 and an eighth curve 1602 show comparative results for a fourth input dataset that included 20640 observations and 8 features. 33% of the observations were treated as testing data to generate the mean square error data shown. Seventh curve 1600 shows a mean square error as a function of a number of trees included in the compressed gradient boosting tree model. Eighth curve 1602 shows a mean square error as a function of a number of trees included in the traditional gradient boosting tree model. To reach the same performance as the traditional gradient boosting tree with 500 trees, the compressed model needed only approximately 20 trees. As a result, less memory is used, faster predictions can be computed, and the results are more interpretable and are improved because there is less error.

Figure 17:
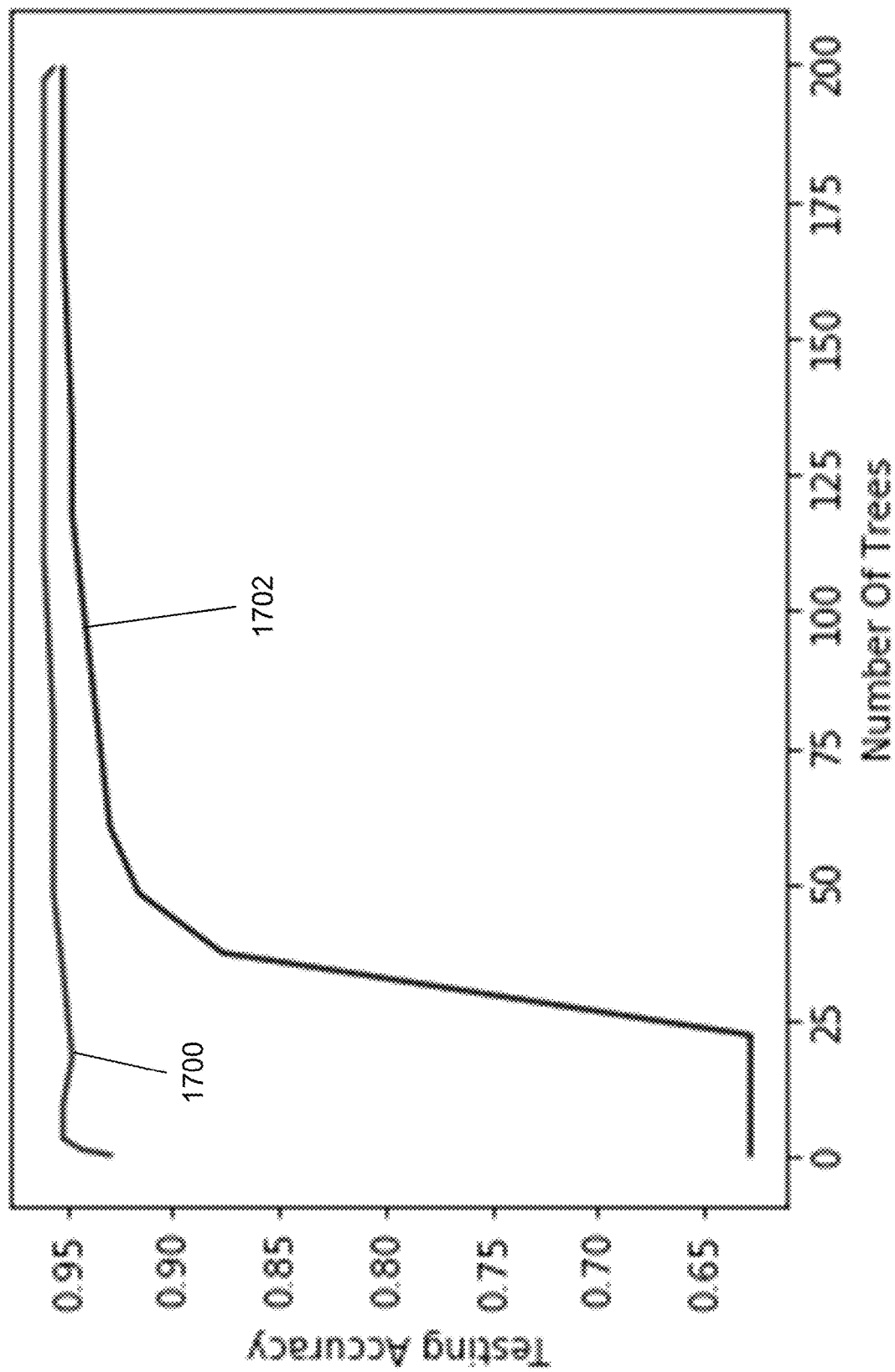
FIG. 17 depicts an accuracy comparison between a traditional gradient boosting tree model and a compressed gradient boosting tree model created using the operations of FIG. 2 using a fifth input dataset in accordance with an illustrative embodiment.

Referring to FIG. 17, a ninth curve 1700 and a tenth curve 1702 show comparative results for a fifth input dataset that included 683 observations and 10 features. 33% of the observations were treated as testing data to generate the test accuracy data shown. Seventh curve 1700 shows a test accuracy as a function of a number of trees included in the compressed gradient boosting tree model. Eighth curve 1702 shows a test accuracy as a function of a number of trees included in the traditional gradient boosting tree model. To reach the same performance as the traditional gradient boosting tree with 200 trees, the compressed model needed only approximately 5 trees. The compressed model reaches a testing accuracy of 95% while the traditional model does not even with 200 trees. As a result, less memory is used, faster predictions can be computed, and the results are more interpretable and more accurate.

Figure 18:
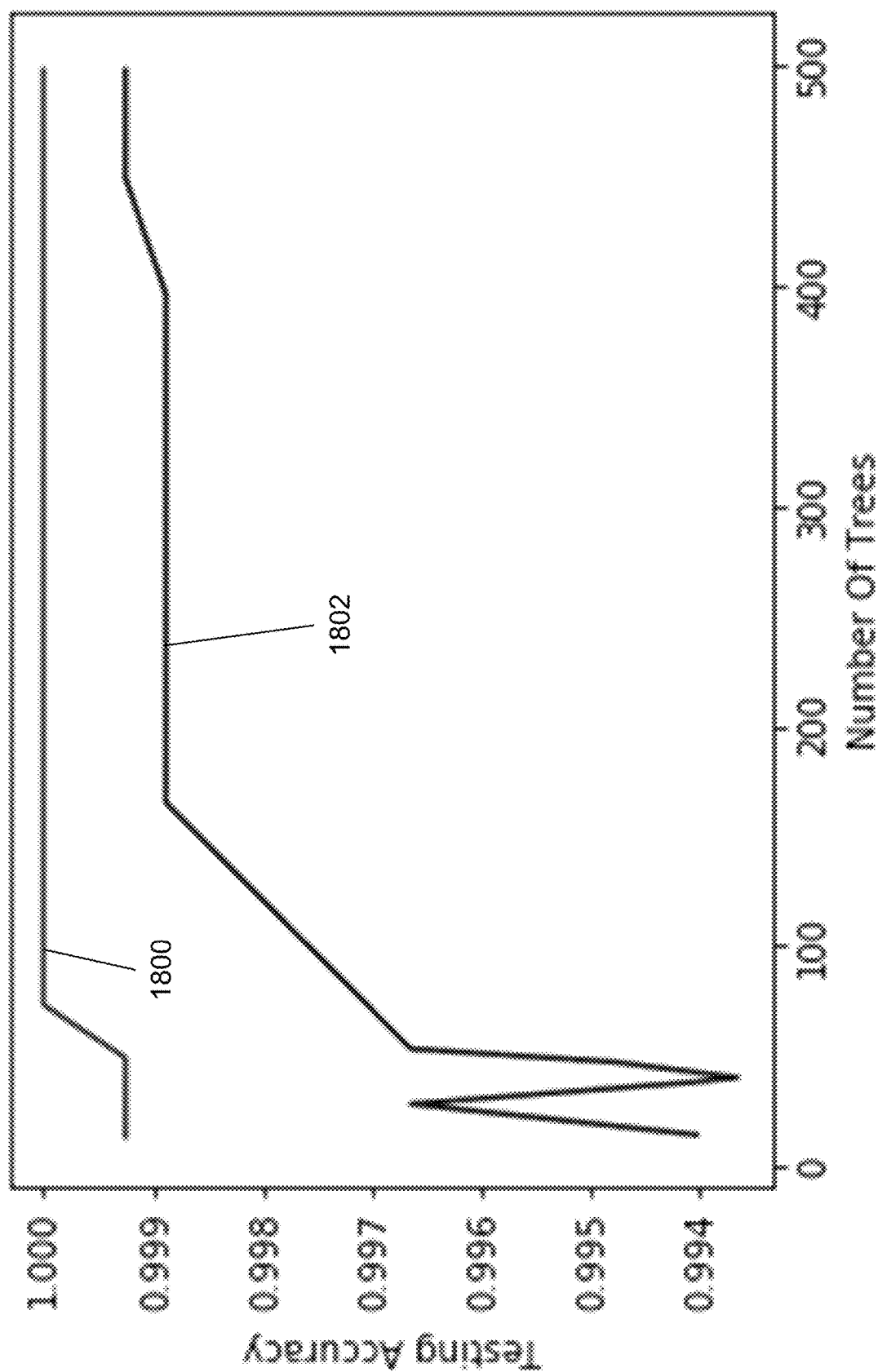
FIG. 18 depicts an accuracy comparison between a traditional gradient boosting tree model and a compressed gradient boosting tree model created using the operations of FIG. 2 using a sixth input dataset in accordance with an illustrative embodiment.

Referring to FIG. 18, an eleventh curve 1800 and a twelfth curve 1802 show comparative results for a sixth input dataset that included 8124 observations and 112 features. 33% of the observations were treated as testing data to generate the test accuracy data shown. Eleventh curve 1800 shows a test accuracy as a function of a number of trees included in the compressed gradient boosting tree model. Twelfth curve 1802 shows a test accuracy as a function of a number of trees included in the traditional gradient boosting tree model. To reach the same performance as the traditional gradient boosting tree with 500 trees, the compressed model needed only approximately 5 trees. The compressed model reaches a testing accuracy of 100% while the traditional model does not even with 500 trees. As a result, less memory is used, faster predictions can be computed, and the results are more interpretable and more accurate.

Figure 19:
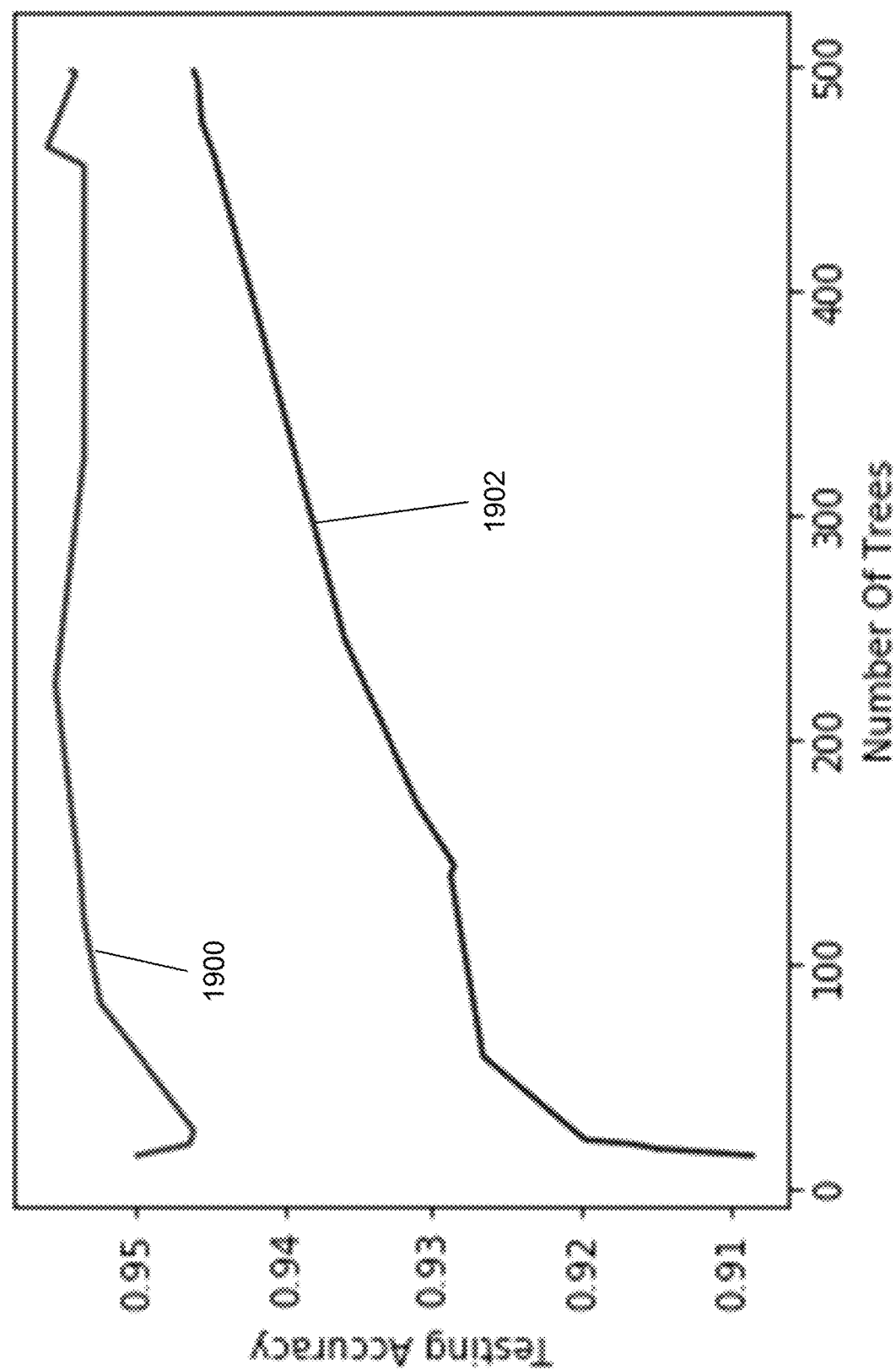
FIG. 19 depicts an accuracy comparison between a traditional gradient boosting tree model and a compressed gradient boosting tree model created using the operations of FIG. 2 using a seventh input dataset in accordance with an illustrative embodiment.

Referring to FIG. 19, a thirteenth curve 1900 and a fourteenth curve 1902 show comparative results for a seventh input dataset that included 11055 observations and 68 features. 33% of the observations were treated as testing data to generate the test accuracy data shown. Thirteenth curve 1900 shows a test accuracy as a function of a number of trees included in the compressed gradient boosting tree model. Fourteenth curve 1902 shows a test accuracy as a function of a number of trees included in the traditional gradient boosting tree model. To reach the same performance as the traditional gradient boosting tree with 500 trees, the compressed model needed only approximately 10 trees. The compressed model reaches a testing accuracy of 97% while the traditional model does not even with 500 trees. As a result, less memory is used, faster predictions can be computed, and the results are more interpretable and more accurate.

Table I below shows the run time improvements.

TABLE I

| Dataset | Existing | | Compressed | | Compression Ratio |
| --- | --- | --- | --- | --- | --- |
| | # Trees | Time (s) | # Trees | Time (s) | |
| Fifth dataset | 200 | 0.047 | 5 | 0.001 | 40 times |
| Sixth dataset | 500 | 0.153 | 72 | 0.004 | 7 times |
| Seventh dataset | 500 | 0.079 | 5 | 0.003 | 100 times |

As discussed, the compressed gradient boosting tree uses fewer trees because it is compressed. Because there are far fewer trees, the resulting model is much more interpretable. For example, it is clear that a model with only 5 trees is more understandable than a model with 200 trees. As shown in FIGS. 13-19 and discussed above, the compressed gradient boosting tree with far fewer trees achieved a more accurate prediction. Because there are far fewer trees, less memory is used to store the compressed gradient boosting tree. For example, it is clear that a model with only 5 trees can be stored with much less memory than a model with 200 trees. Because there are far fewer trees in the compressed gradient boosting tree, the model executes much faster resulting in a faster prediction. For example, it is clear that a model with only 5 trees can be executed much faster than a model with 200 trees as summarized in Table I.

Figure 5:
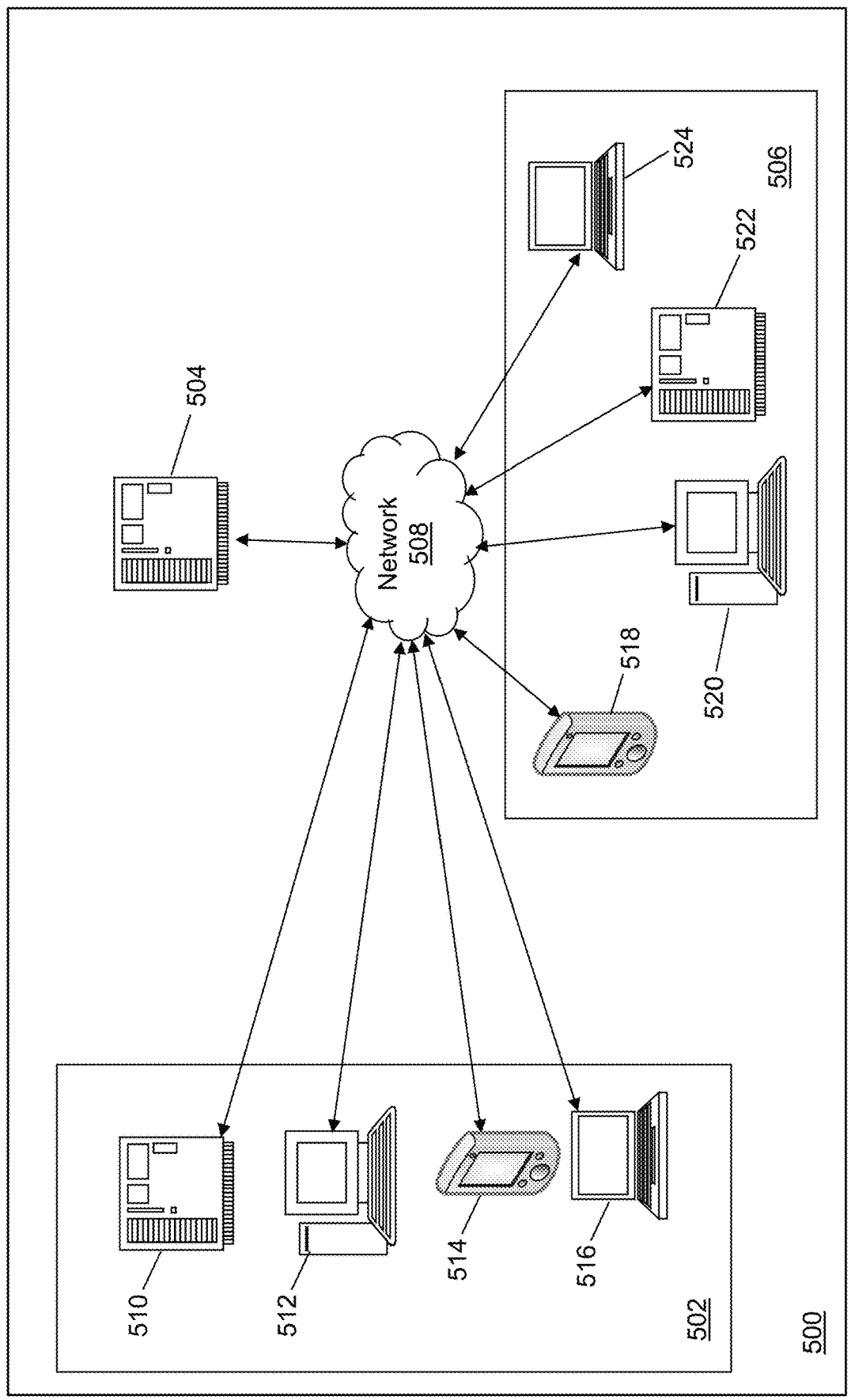
FIG. 5 depicts a block diagram of a stream processing system in accordance with an illustrative embodiment.

Referring to FIG. 5, a block diagram of a stream processing system 500 is shown in accordance with an illustrative embodiment. In an illustrative embodiment, stream processing system 500 may include an event publishing system 502, a ESP device 504, an event subscribing system 506, and a network 508. Each of event publishing system 502, ESP device 504, and event subscribing system 506 may be composed of one or more discrete devices in communication through network 508.

Event publishing system 502 includes, is integrated with, and/or communicates with one or more sensors, data generation devices, data capture devices, etc. For example, a sensor may produce a sensor signal value referred to as a measurement data value representative of a measure of a physical quantity in an environment to which the sensor is associated and generate a corresponding measurement datum that typically is associated with a time that the measurement datum is generated. The environment to which the sensor is associated for monitoring may include a surveillance system, a medical imaging device, a power grid system, a telecommunications system, a fluid (e.g., oil, gas, water, etc.) pipeline, a transportation system, an industrial device, a medical device, an appliance, a vehicle, a computing device, etc. Example sensors include a camera or other image creation device, a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system. As another example, a data generation device may be a computing device that generates a measurement data value in response to occurrence of an event. As still another example, a data capture device may be a computing device that receives a measurement data value generated by another device that may be in response to an event.

For example, a truck may be equipped with hundreds of sensors though as autonomous vehicle technology advances, the number of sensors is increasing rapidly. These sensors stream all types of events that are valuable to both a truck driver and a truck manufacturer. Some events require immediate reactions via Edge Analytics while others need to be processed in the Cloud where more comprehensive and detailed analysis is performed. However, the deployment of analytic tools and models in the Cloud that meets the requirements of large scale, geographically distributed, and highly dynamic sensors is challenging.

Event publishing system 502 publishes the measurement data value to ESP device 504 as an "event". An event is a data record that reflects something that has happened and is a data record. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An upsert opcode updates the event object if a key field already exists; otherwise, the event object is inserted. ESP device 504 receives the measurement data value in an event stream, processes the measurement data value, and identifies a computing device of event subscribing system 506 to which the processed measurement data value is sent.

Network 508 may include one or more networks of the same or different types. Network 508 can be any type of wired and/or wireless public or private network including a cellular network, a local area network, a wide area network such as the Internet or the World Wide Web, etc. Network 508 further may comprise sub-networks and consist of any number of communication devices.

The one or more computing devices of event publishing system 502 may include computing devices of any form factor such as a server computer 510, a desktop 512, a smart phone 514, a laptop 516, a personal digital assistant, an integrated messaging device, a tablet computer, a point of sale system, a transaction system, etc. Event publishing system 502 can include any number and any combination of form factors of computing devices that may be organized into subnets. The computing devices of event publishing system 502 send and receive signals through network 508 to/from another of the one or more computing devices of event publishing system 502 and/or to/from ESP device 504. The one or more computing devices of event publishing system 502 may communicate using various transmission media that may be wired and/or wireless as understood by those skilled in the art. The one or more computing devices of event publishing system 502 may be geographically dispersed from each other and/or co-located. Each computing device of the one or more computing devices of event publishing system 502 may be executing one or more event publishing application.

Figure 6:
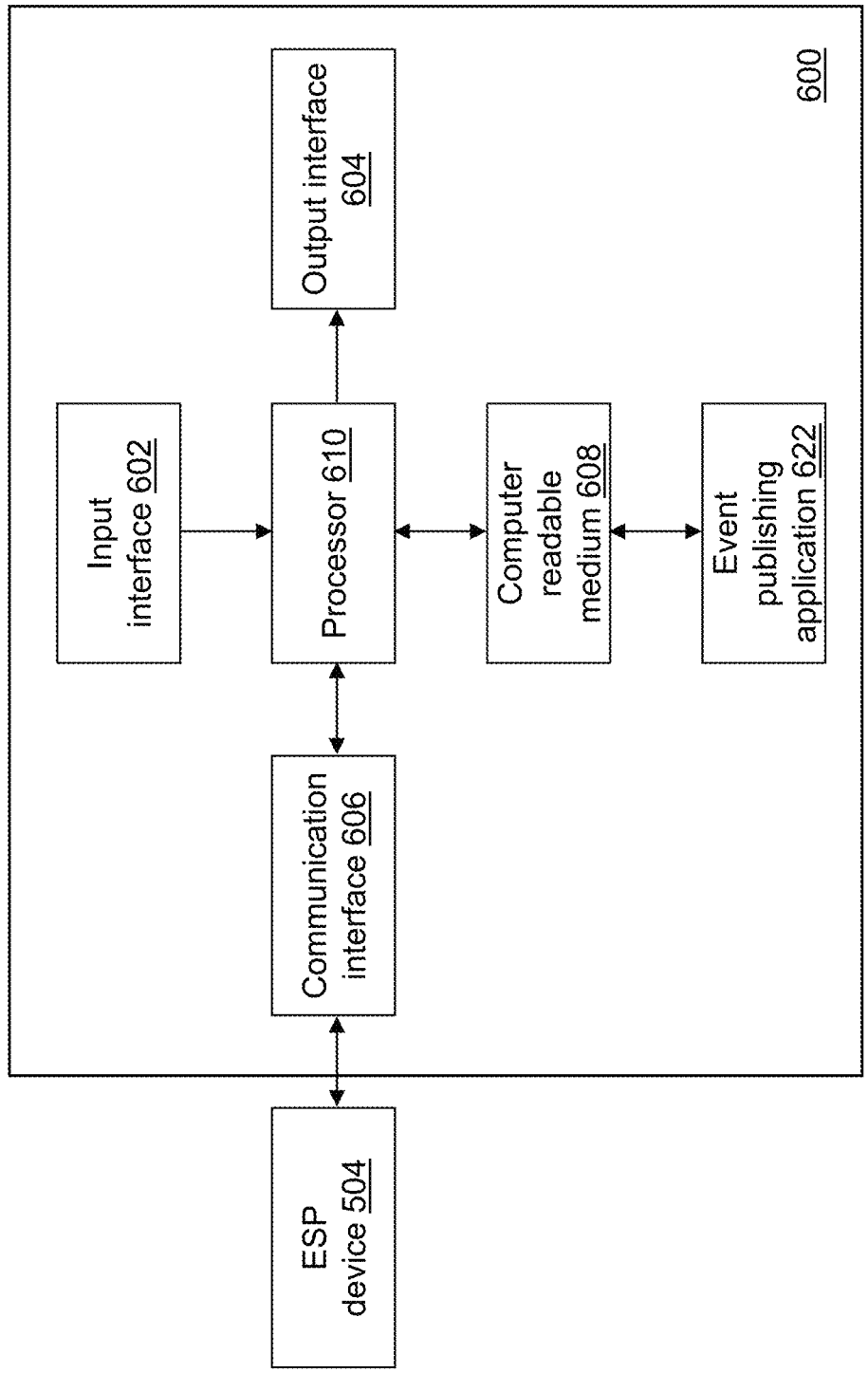
FIG. 6 depicts a block diagram of an event publishing device of an event publishing system of the stream processing system of FIG. 5 in accordance with an illustrative embodiment.

For illustration, referring to FIG. 6, a block diagram of an event publishing device 600 is shown in accordance with an example embodiment. Event publishing device 600 is an example computing device of event publishing system 502. For example, each of server computer 510, desktop 512, smart phone 514, and laptop 516 may be an instance of event publishing device 600. Event publishing device 600 may include a third input interface 602, a third output interface 604, a third communication interface 606, a third non-transitory computer-readable medium 608, a third processor 610, and an event publishing application 622. Each computing device of event publishing system 502 may be executing event publishing application 622 of the same or a different type.

Referring again to FIG. 5, the one or more computing devices of event subscribing system 506 may include computers of any form factor such as a smart phone 518, a desktop 520, a server computer 522, a laptop 524, a personal digital assistant, an integrated messaging device, a tablet computer, etc. Event subscribing system 506 can include any number and any combination of form factors of computing devices. The computing devices of event subscribing system 506 send and receive signals through network 508 to/from ESP device 504. The one or more computing devices of event subscribing system 506 may be geographically dispersed from each other and/or co-located. The one or more computing devices of event subscribing system 506 may communicate using various transmission media that may be wired and/or wireless as understood by those skilled in the art. Each computing device of the one or more computing devices of event subscribing system 506 may be executing one or more event subscribing application.

Figure 9:
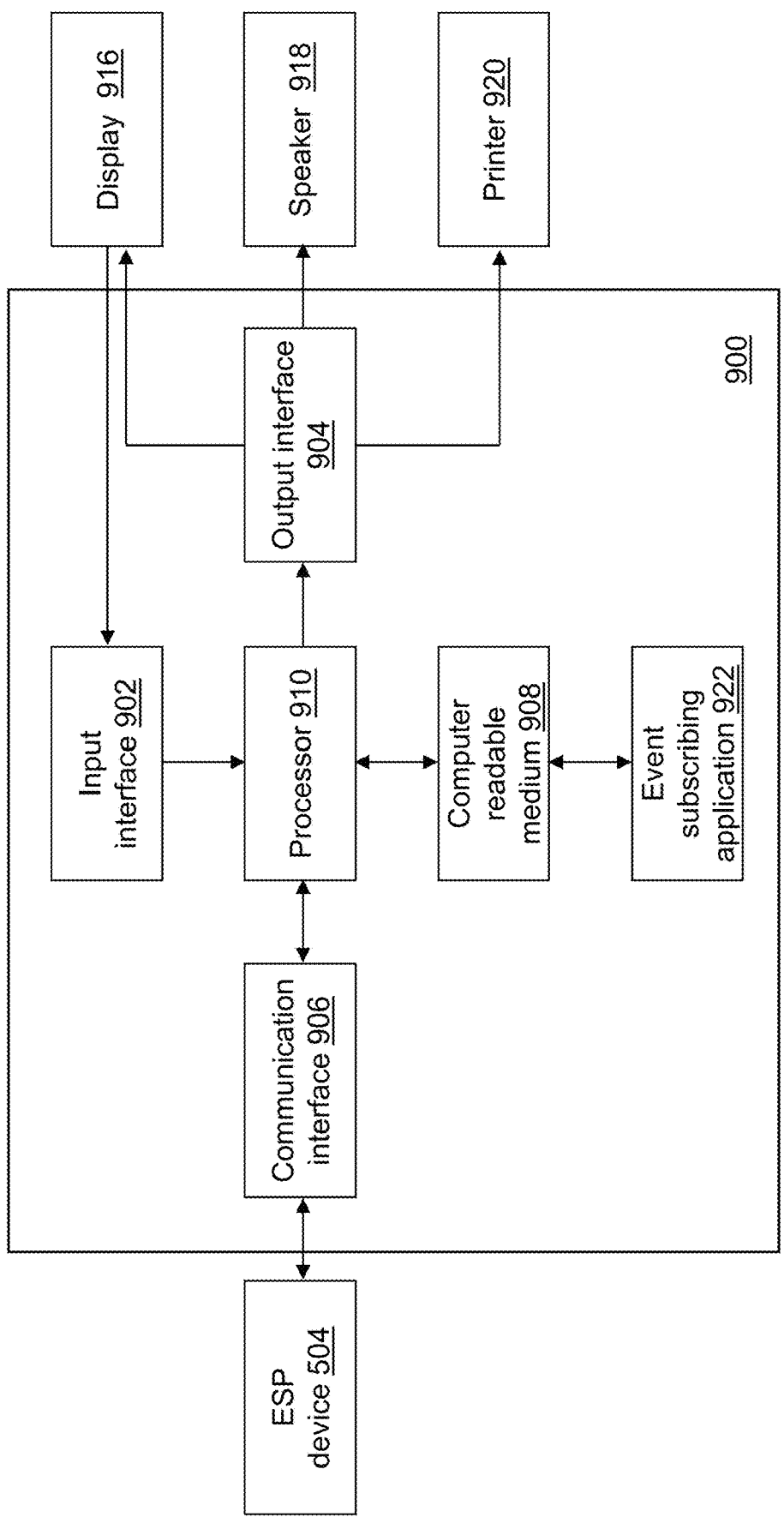
FIG. 9 depicts a block diagram of an event subscribing device of an event subscribing system of the stream processing system of FIG. 5 in accordance with an illustrative embodiment.

For illustration, referring to FIG. 9, a block diagram of an event subscribing device 900 is shown in accordance with an example embodiment. Event subscribing device 900 is an example computing device of event subscribing system 506. For example, each of smart phone 518, desktop 520, server computer 522, and laptop 524 may be an instance of event subscribing device 900. Event subscribing device 900 may include a fourth input interface 902, a fourth output interface 904, a fourth communication interface 906, a fourth computer-readable medium 908, a fourth processor 910, and an event subscribing application 922. Each computing device of event subscribing system 506 may be executing event subscribing application 922 of the same or different type.

Referring again to FIG. 5, ESP device 504 can include any form factor of computing device. For illustration, FIG. 5 represents ESP device 504 as a server computer. In general, a server computer may include faster processors, additional processors, more disk memory, and/or more random access memory (RAM) than a client computer and support multi-threading as understood by a person of skill in the art. ESP device 504 sends and receives signals through network 508 to/from event publishing system 502 and/or to/from event subscribing system 506. ESP device 504 may communicate using various transmission media that may be wired and/or wireless as understood by those skilled in the art. ESP device 504 may be implemented on a plurality of computing devices of the same or different type. Stream processing system 500 further may include a plurality of ESP devices.

Figure 11:
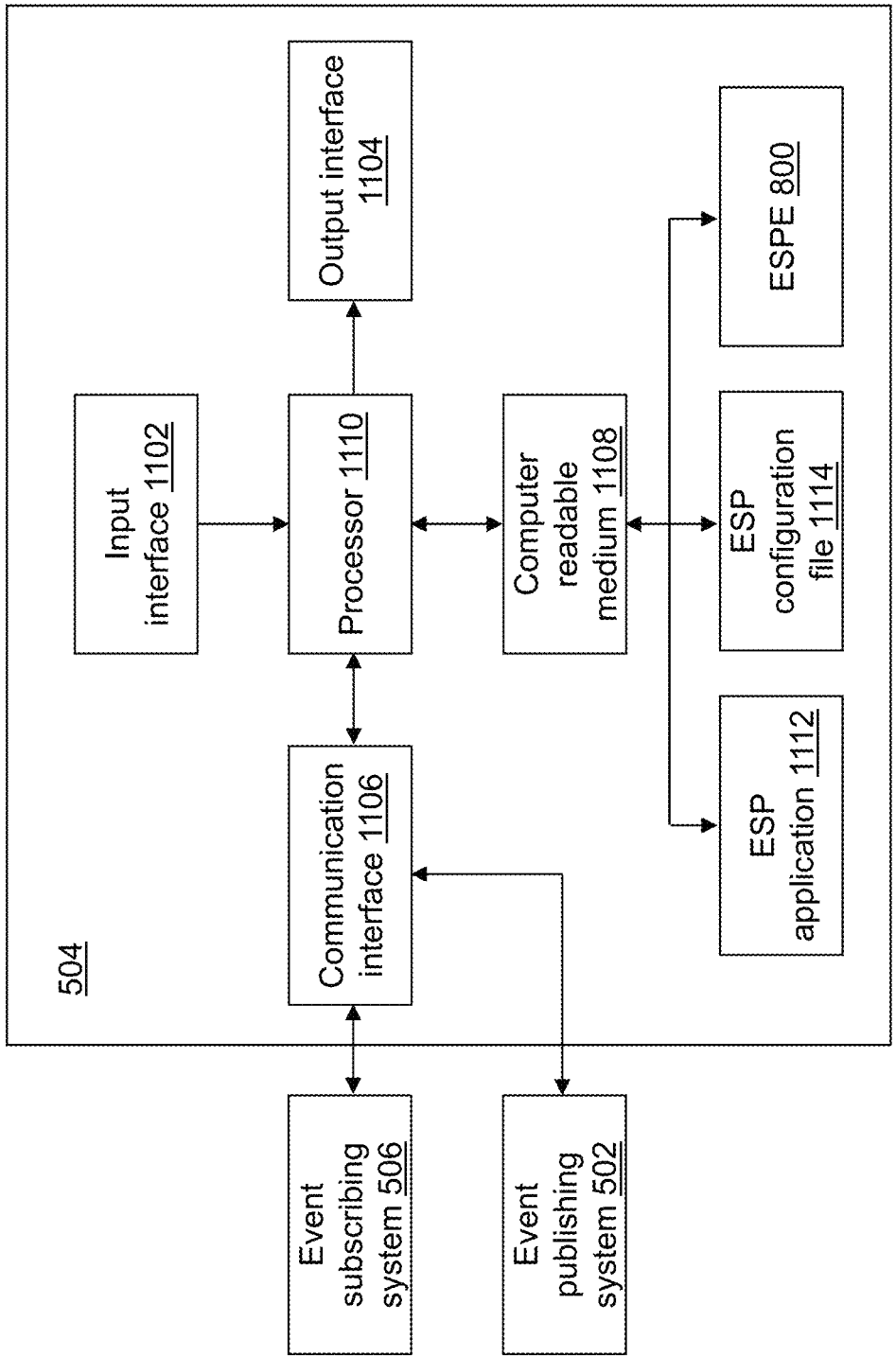
FIG. 11 depicts a block diagram of an ESP device of the stream processing system of FIG. 5 in accordance with an illustrative embodiment.

For illustration, referring to FIG. 11, a block diagram of ESP device 504 is shown in accordance with an example embodiment. ESP device 504 may include a fifth input interface 1102, a fifth output interface 1104, a fifth communication interface 1106, a fifth computer-readable medium 1108, a fifth processor 1110, an ESP application 1112, an ESP configuration file 1114, and an ESPE 800. ESP device 504 executes ESP application 1112 that reads ESP configuration file 1114 to instantiate ESPE 800 to perform the operations of predictive model training application 122 and/or of predictive application 322.

Referring to FIG. 6, each event publishing device 600 of event publishing system 502 may include the same or different components and combinations of components. Fewer, different, and additional components may be incorporated into event publishing device 600. Event publishing device 600 may be part of the Internet of Things (IoT), where things (e.g., machines, devices, phones, sensors, smart meters for energy, personal wearable devices, health monitoring devices, autonomous vehicle devices, robotic components, identification devices, etc.) can be connected to networks and the data from these things collected and processed within the things and/or external to the things. For example, event publishing device 600 can include one or more types of the same or different sensors, and high value analytics can be applied to identify hidden relationships and drive increased efficiencies. This can apply to both big data analytics and real-time analytics. Event publishing device 600 may be referred to as an edge device, and may include edge computing circuitry. Event publishing device 600 may provide a variety of stored or generated data, such as network data or data specific to the network devices themselves.

In one example practical application, ESP can be employed for predictive maintenance in the trucking industry, which is responsible for moving around 10.5 billion tons of freight over 279 billion miles per year. ESP can be used to predict part failures and keep trucks on the road longer. Trucks may have hundreds of sensors that collect many different types of data, for example, from oil temperatures to engine load to turbo boost. Edge devices on the trucks can allow a trucking company to weed out data as close to the source as possible, and can initiate action in response to pertinent information in sub-second time frames. This way, the trucking company does not have to move all of their data through network 508 or even store it in the cloud or on-premises in some situations. Also, by monitoring, filtering, and analyzing data at the source, the truck driver can be instantly alerted when, for example, oil temperature and turbo boost numbers spike at the same time. ESP can be used to recognize this pattern, which can trigger an alert that turbocharger service is needed, and the truck can be fixed in a nearby maintenance facility before any major damage occurs to the truck.

In addition to edge analytics performed at the individual truck level, there can be multi-phase analytics for ESP running on-premises or in the cloud, where the trucking company can be enabled to analyze massive amounts of data across a fleet of trucks. Cross-entity analytics can be performed by aggregating data from all of the IoT gateways that are installed on their trucks in their fleet.

ESP can further be use enable the trucking company to take what it learned from the historical data, train new models, update existing models, and bring the new or revised models back to the edge (e.g., the truck). These operations can be performed dynamically (e.g., on the fly) and while the trucks are still on the road.

Third input interface 602 provides the same or similar functionality as that described with reference to input interface 102 of predictive model training device 100 though referring to event publishing device 600. Third output interface 604 provides the same or similar functionality as that described with reference to output interface 104 of predictive model training device 100 though referring to event publishing device 600. Third communication interface 606 provides the same or similar functionality as that described with reference to communication interface 106 of predictive model training device 100 though referring to event publishing device 600. Data and messages may be transferred between event publishing device 600 and ESP device 504 using third communication interface 606. Third computer-readable medium 608 provides the same or similar functionality as that described with reference to computer-readable medium 108 of predictive model training device 100 though referring to event publishing device 600. Third processor 610 provides the same or similar functionality as that described with reference to processor 110 of predictive model training device 100 though referring to event publishing device 600.

Event publishing application 622 performs operations associated with generating, capturing, and/or receiving a measurement data value and publishing the measurement data value in an event stream to one or more computing devices of event subscribing system 506 through ESP device 504. The operations may be implemented using hardware, firmware, software, or any combination of these methods. Referring to the example embodiment of FIG. 6, event publishing application 622 is implemented in software (comprised of computer-readable and/or computer-executable instructions) stored in third computer-readable medium 608 and accessible by third processor 610 for execution of the instructions that embody the operations of event publishing application 622. Event publishing application 622 may be written using one or more programming languages, assembly languages, scripting languages, etc. Event publishing application 622 may be implemented as a Web application.

Figure 7:
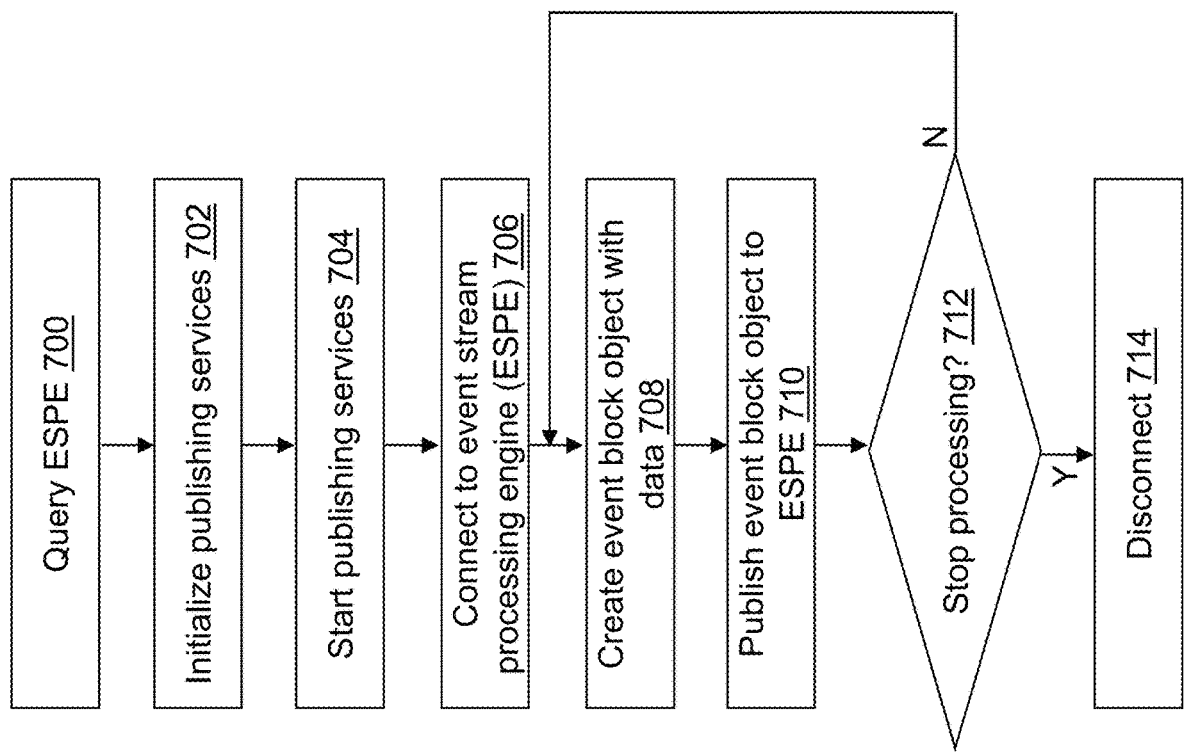
FIG. 7 depicts a flow diagram illustrating examples of operations performed by the event publishing device of FIG. 6 in accordance with an illustrative embodiment.

Referring to FIG. 7, example operations associated with event publishing application 622 are described. Additional, fewer, or different operations may be performed depending on the embodiment. The order of presentation of the operations of FIG. 7 is not intended to be limiting. A user can interact with one or more user interface windows presented to the user in a display under control of event publishing application 622 independently or through a browser application in an order selectable by the user. Although some of the operational flows are presented in sequence, the various operations may be performed in various repetitions, concurrently, and/or in other orders than those that are illustrated. For example, a user may execute event publishing application 622, which causes presentation of a first user interface window, which may include a plurality of menus and selectors such as drop-down menus, buttons, text boxes, hyperlinks, etc. associated with event publishing application 622 as understood by a person of skill in the art. As further understood by a person of skill in the art, various operations may be performed in parallel, for example, using a plurality of threads or a plurality of computing devices such as a grid or a cloud of computing devices.

Figure 8:
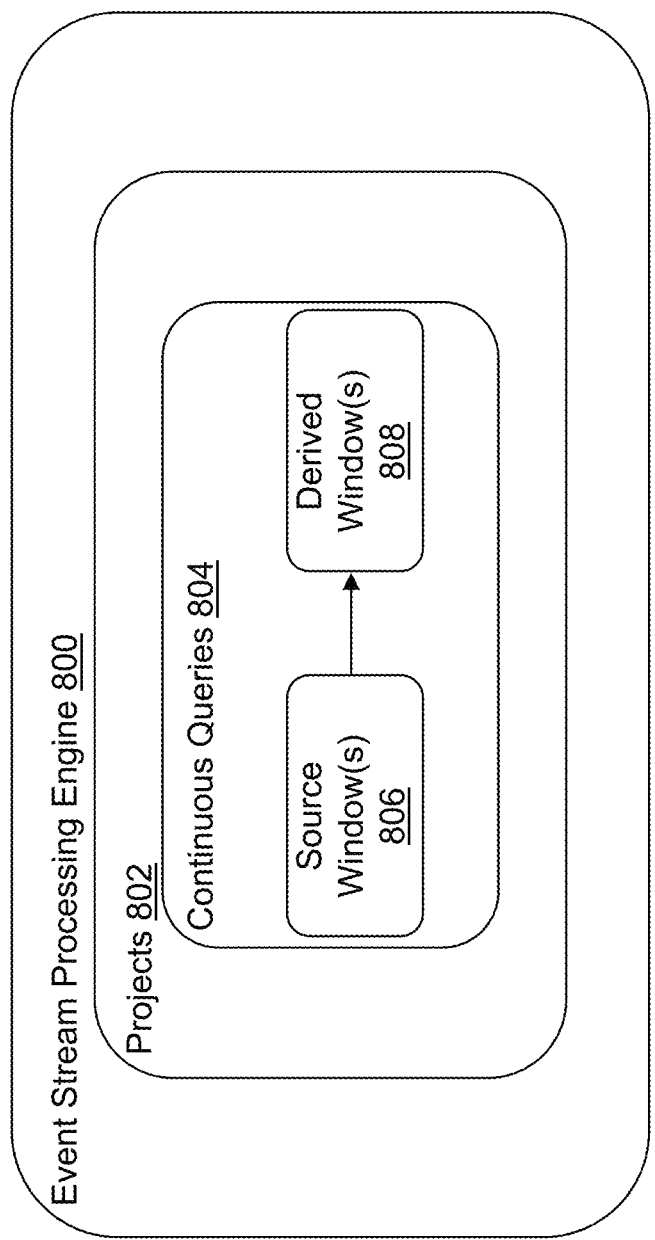
FIG. 8 depicts a block diagram of an event stream processing (ESP) engine executing on an ESP device of the stream processing system of FIG. 5 in accordance with an illustrative embodiment.

In an operation 700, an ESPE 800 is queried, for example, to discover projects 802, continuous queries 804, windows 806, 808, window schema, and window edges currently running in ESPE 800. For example, referring to FIG. 8, the components of ESPE 800 are shown in accordance with an illustrative embodiment. In an illustrative embodiment, event publishing device 600 queries ESPE 800.

ESPE 800 may include one or more projects 802. A project may be described as a second-level container in an engine model managed by ESPE 800 where a thread pool size for the project may be defined by a user. A value of one for the thread pool size indicates that writes are single-threaded. Each project of the one or more projects 802 may include one or more continuous queries 804 that contain data flows, which are data transformations of incoming event streams. The one or more continuous queries 804 may include one or more source windows 806 and one or more derived windows 808.

The engine container is the top-level container in a model that manages the resources of the one or more projects 802. In an illustrative embodiment, for example, there is a single ESPE 800 for each instance of an ESP model executed. Each ESPE 800 has a unique engine name. Additionally, the one or more projects 802 may each have unique project names, and each query may have a unique continuous query name and begin with a uniquely named source window of the one or more source windows 806. Each ESPE 800 may or may not be persistent. Each ESPE 800 is a unique process so the projects/queries/windows need not be uniquely named. They are distinguished by the unique input streams received on ESPE-specific TCP/IP connections.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 800 can support the opcodes for events including insert, update, upsert, and delete. As a result, events entering a source window of the one or more source windows 806 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, partial-update, or a retention generated event from retention policy management, and one or more microsecond timestamps. For example, the one or more microsecond timestamps may indicate a sensor data generation time, a data receipt time by event publishing device 600, a data transmit time by event publishing device 600, a data receipt time by ESPE 800, etc.

An event block object may be described as a grouping or package of one or more event objects. An event stream may be described as a flow of event block objects. A continuous query of the one or more continuous queries 804 transforms the incoming event stream made up of streaming event block objects published into ESPE 800 into one or more outgoing event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams are directed to the next set of connected windows as defined by the directed graph. The one or more derived windows 808 are all instantiated windows that are not source windows and that have other windows streaming events into them. The one or more derived windows 808 perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Referring again to FIG. 7, the engine name and host/port to ESPE 800 may be provided as an input to the query and a list of strings may be returned with the names of the projects 802, of the continuous queries 804, of the windows 806, 808, of the window schema, and/or of the window edges of currently running projects of ESPE 800. The host is associated with a host name or Internet Protocol (IP) address of ESP device 504. The port is the port number provided when a publish/subscribe (pub/sub) capability is initialized by ESPE 800. The engine name is the name of ESPE 800 such as the engine name of ESPE 800. The engine name of ESPE 800 and host/port to ESP device 504 may be read from a storage location on third computer-readable medium 608, may be provided on a command line, or otherwise input to or defined by event publishing application 622 as understood by a person of skill in the art.

In an operation 702, publishing services are initialized.

In an operation 704, the initialized publishing services are started, which may create a publishing client for the instantiated event publishing application 622. The publishing client performs the various pub/sub activities for the instantiated event publishing application 622. For example, a string representation of a URL to ESPE 800 is passed to a "Start" function. For example, the URL may include the host:port designation of ESPE 800 executing on ESP device 504, a project of the projects 802, a continuous query of the continuous queries 804, and a window of the source windows 806. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 622 is publishing to more than one source window of ESPE 800, the initialized publishing services may be started to each source window using the associated names (project name, continuous query name, source window name).

Pub/sub is a message-oriented interaction paradigm based on indirect addressing. Each event subscribing device 900 of event subscribing system 506 specifies their interest in receiving information from ESPE 800 by subscribing to specific classes of events, while information sources such as event publishing device 600 publish events to ESPE 800 without directly addressing the data recipients. Stream processing system 500 includes ESPE 800 that receives events from event publishing application 622 executing on event publishing device 600 of event publishing system 502 and that publishes processed events to and publishes further processed events to event subscribing application 922 of event subscribing device 900 of event subscribing system 506.

In an operation 706, a connection is made between event publishing application 622 and ESPE 800 executing on ESP device 504 for each source window of the source windows 806 to which any measurement data value is published. To make the connection, the pointer to the created publishing client may be passed to a "Connect" function. If event publishing application 622 is publishing to more than one source window of ESPE 800, a connection may be made to each started window using the pointer returned for the respective "Start" function call.

In an operation 708, an event block object is created by event publishing application 622 that includes a measurement data value. The measurement data value may have been received, captured, generated, etc., for example, through third communication interface 606 or third input interface 602 or by third processor 610. The measurement data value may be processed before inclusion in the event block object, for example, to change a unit of measure, convert to a different reference system, etc. The event block object may include a plurality of measurement data values measured at different times and/or by different devices.

In an operation 710, the created event block object is published to ESPE 800, for example, using the pointer returned for the respective "Start" function call to the appropriate source window. Event publishing application 622 passes the created event block object to the created publishing client, where the unique ID field in the event block object has been set by event publishing application 622 possibly after being requested from the created publishing client. In an illustrative embodiment, event publishing application 622 may wait to begin publishing until a "Ready" callback has been received from the created publishing client. The event block object is injected into the source window, continuous query, and project associated with the started publishing client.

In an operation 712, a determination is made concerning whether or not processing is stopped. If processing is not stopped, processing continues in operation 708 to continue creating and publishing event block objects. If processing is stopped, processing continues in an operation 714.

In operation 714, the connection made between event publishing application 622 and ESPE 800 through the created publishing client is disconnected, and each started publishing client is stopped.

Referring again to FIG. 9, fewer, different, and additional components may be incorporated into event subscribing device 900. Each event subscribing device 900 of event subscribing system 506 may include the same or different components or combination of components.

Fourth input interface 902 provides the same or similar functionality as that described with reference to input interface 102 of predictive model training device 100 though referring to event subscribing device 900. Fourth output interface 904 provides the same or similar functionality as that described with reference to output interface 104 of predictive model training device 100 though referring to event subscribing device 900. Fourth communication interface 906 provides the same or similar functionality as that described with reference to communication interface 106 of predictive model training device 100 though referring to event subscribing device 900. Data and messages may be transferred between event subscribing device 900 and ESP device 504 using fourth communication interface 906. Fourth computer-readable medium 908 provides the same or similar functionality as that described with reference to computer-readable medium 108 of predictive model training device 100 though referring to event subscribing device 900. Fourth processor 910 provides the same or similar functionality as that described with reference to processor 110 of predictive model training device 100 though referring to event subscribing device 900.

Figure 10:
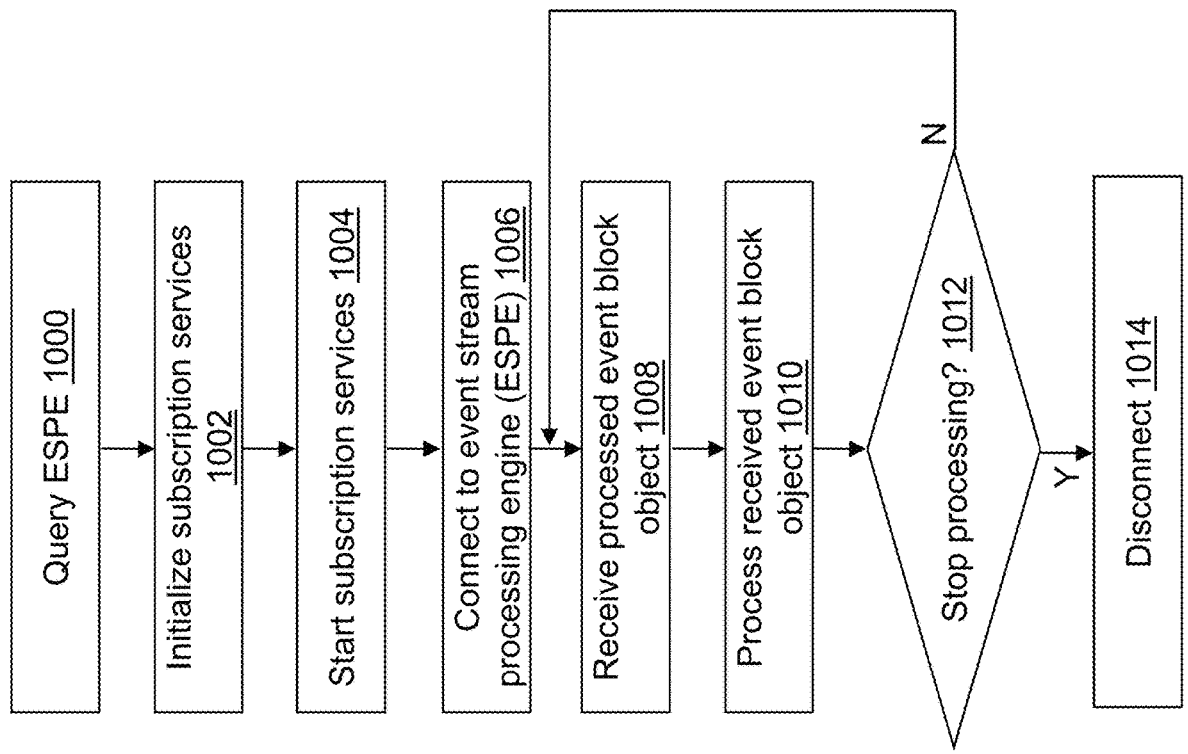
FIG. 10 depicts a flow diagram illustrating examples of operations performed by the event subscribing device of FIG. 9 in accordance with an illustrative embodiment.

Referring to FIG. 10, example operations associated with event subscribing application 912 are described. Additional, fewer, or different operations may be performed depending on the embodiment. The order of presentation of the operations of FIG. 10 is not intended to be limiting.

Similar to operation 700, in an operation 1000, ESPE 800 is queried, for example, to discover names of projects 802, of continuous queries 804, of windows 406,608, of window schema, and of window edges currently running in ESPE 800.

In an operation 1002, subscription services are initialized.

In an operation 1004, the initialized subscription services are started, which may create a subscribing client on behalf of event subscribing application 912 at event subscribing device 900. The subscribing client performs the various pub/sub activities for event subscribing application 912. For example, a URL to ESPE 800 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1006, a connection may be made between event subscribing application 912 executing on event subscribing device 900 and ESPE 800 through the created subscribing client. To make the connection, the pointer to the created subscribing client may be passed to a "Connect" function and a mostly non-busy wait loop created to wait for receipt of event block objects.

In an operation 1008, an event block object is received by event subscribing application 912 executing on event subscribing device 900.

In an operation 1010, the received event block object is processed based on the operational functionality provided by event subscribing application 912. For example, event subscribing application 912 may extract data from the received event block object and store the extracted data in a database. In addition, or in the alternative, event subscribing application 912 may extract data from the received event block object and send the extracted data to a system control operator display system, an automatic control system, a notification device, an analytic device, etc. In addition, or in the alternative, event subscribing application 912 may extract data from the received event block object and send the extracted data to a post-incident analysis device to further analyze the data. Event subscribing application 912 may perform any number of different types of actions as a result of extracting data from the received event block object. The action may involve presenting information on a fourth display 916 or a fourth printer 920, presenting information using a fourth speaker 918, storing data in fourth computer-readable medium 908, sending information to another device using fourth communication interface 906, etc. A user may further interact with presented information using a fourth mouse 914 and/or a fourth keyboard 912.

In an operation 1012, a determination is made concerning whether or not processing is stopped. If processing is not stopped, processing continues in operation 1008 to continue receiving and processing event block objects. If processing is stopped, processing continues in an operation 1014.

In operation 1014, the connection made between event subscribing application 912 and ESPE 800 through the subscribing client is disconnected, and the subscribing client is stopped.

Referring again to FIG. 11, fewer, different, or additional components may be incorporated into ESP device 504. ESP device 504 receives event block objects that may include measurement data values from event publishing system 502. Fifth computer-readable medium 1108 may provide an electronic storage medium for the received event block objects.

Fifth input interface 1102 provides the same or similar functionality as that described with reference to input interface 102 of predictive model training device 100 though referring to ESP device 504. Fifth output interface 1104 provides the same or similar functionality as that described with reference to output interface 104 of predictive model training device 100 though referring to ESP device 504. Third communication interface 1106 provides the same or similar functionality as that described with reference to communication interface 106 of predictive model training device 100 though referring to ESP device 504. Data and messages may be transferred between ESP device 504 and event publishing system 502 and/or event subscribing system 506 using fifth communication interface 1106. Fifth computer-readable medium 1108 provides the same or similar functionality as that described with reference to computer-readable medium 108 of predictive model training device 100 though referring to ESP device 504. Fifth processor 1110 provides the same or similar functionality as that described with reference to processor 110 of predictive model training device 100 though referring to ESP device 504.

ESP application 1112 performs operations associated with coordinating event stream flow between event publishing system 502 and event subscribing system 506 through the one or more computing devices of ESP cluster system 106. The operations may be implemented using hardware, firmware, software, or any combination of these methods. Referring to the example embodiment of FIG. 11, ESP application 1112 is implemented in software (comprised of computer-readable and/or computer-executable instructions) stored in fifth computer-readable medium 1108 and accessible by fifth processor 1110 for execution of the instructions that embody the operations of ESP application 1112. ESP application 1112 may be written using one or more programming languages, assembly languages, scripting languages, etc. ESP application 1112 may be implemented as a Web application.

ESP application 1112 may be developed, for example, using a modeling application programming interface (API) that provides a set of classes with member functions. As an example, the SAS® ESP Engine developed and provided by SAS Institute Inc. of Cary, N.C., USA provides a modeling API that provides a set of classes with member functions. These functions enable ESP application 1112 to instantiate and to embed ESPE 800, possibly with dedicated thread pools into its own process space.

Figure 12:
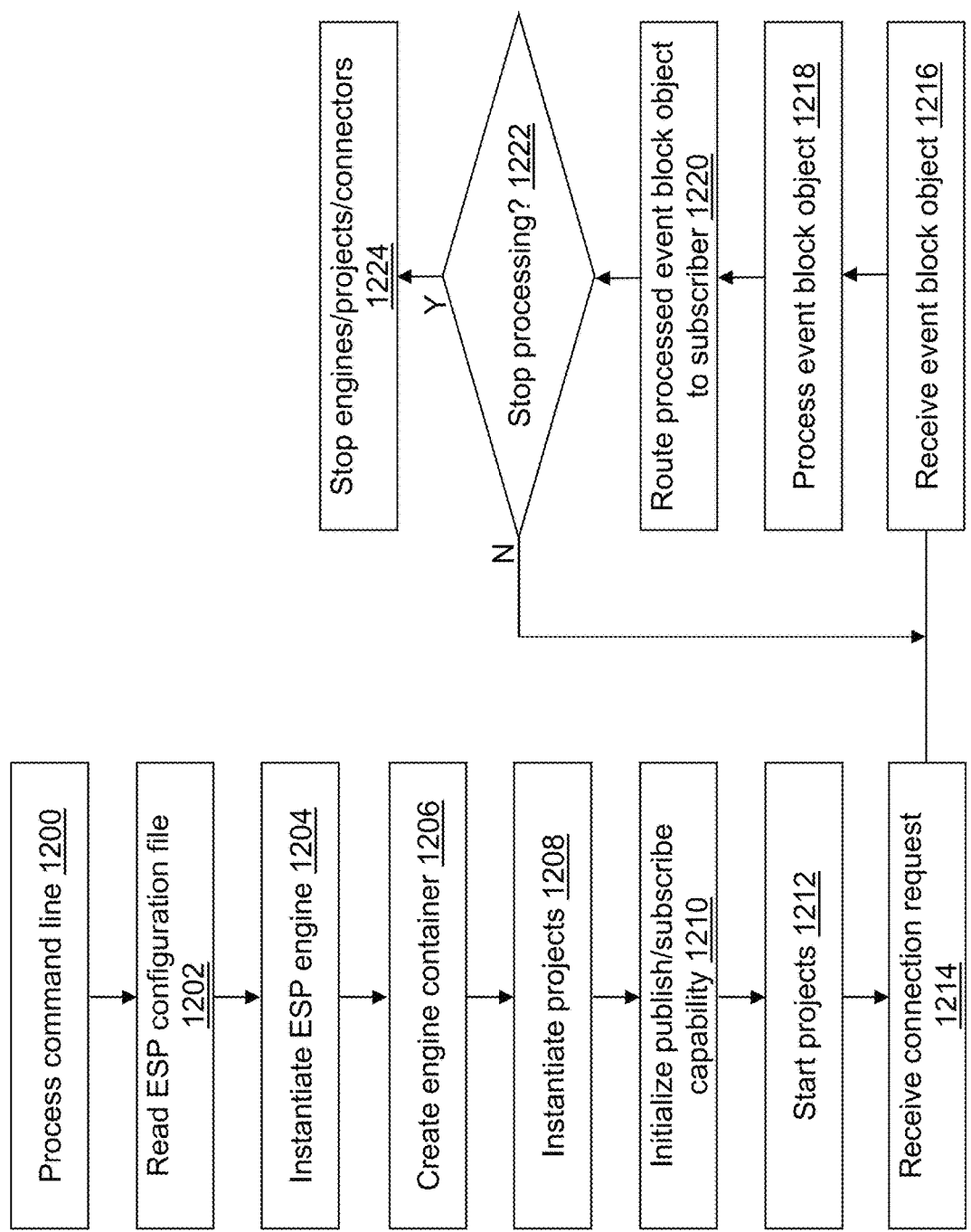
FIG. 12 depicts a flow diagram illustrating examples of operations performed by the ESP device of FIG. 11 in accordance with an illustrative embodiment.

Referring to FIG. 12, example operations associated with ESP application 1112 are described. ESP application 1112 defines how incoming event streams from event publishing system 502 are transformed into meaningful outgoing event streams consumed by event subscribing system 506. Additional, fewer, or different operations may be performed depending on the embodiment. The order of presentation of the operations of FIG. 12 is not intended to be limiting In an operation 1200, a command line is processed to initiate execution of ESP application 1112. A name and a location of ESP configuration file 1114 may be specified as an input parameter. In alternative embodiments, the command line parameters may be defined by default, input by a user through a user interface, etc.

In an operation 1202, ESP configuration file 1114 is read. For illustration, ESP configuration file 1114 may define an XML file that is parsed to define various parameters that are processed to dynamically control the operations performed by ESP application 1112. For example, ESP configuration file 1114 may include a name and a location of predictive model description 126.

In an operation 1204, ESPE 800 is instantiated based on the "start=engine" definition read from ESP configuration file 1114.

In an operation 1206, the engine container is created. For illustration, ESPE 800 may be instantiated using a function call that specifies the engine container as a manager for the model. The function call may include the engine name for ESPE 800 that may be unique to ESPE 800.

In an operation 1208, the one or more projects 802 defined by ESP configuration file 1114 are instantiated by ESPE 800 as a model. Instantiating the one or more projects 802 also instantiates the one or more continuous queries 804, the one or more source windows 806, and the one or more derived windows 808 read from ESP configuration file 1114. The one or more continuous queries 804 may be instantiated with a dedicated thread pool or pools that generate updates as new event block objects stream through ESPE 800. For example, the instantiated projects may instantiate the compressed gradient boosting tree model read from predictive model description 126.

In an operation 1210, the pub/sub capability is initialized for ESPE 800. In an illustrative embodiment, the pub/sub capability is initialized for each project of the one or more projects 802 read from ESP configuration file 1114.

In an operation 1212, the one or more projects 802 read from ESP configuration file 1114 are started. The one or more started projects may run in the background on ESP device 504.

In an operation 1214, a connection request is received from event publishing device 600 for a source window of ESPE 800 to which data will be published or from event subscribing device 900 for a derived window of ESPE 800 from which data will be received.

In an operation 1216, an event block object is received by ESPE 800 from event publishing device 600. An event block object containing one or more event objects is injected into a source window of the one or more source windows 806 read from ESP configuration file 1114. For example, one or more datum values may be input to the compressed gradient boosting model instantiated based on data read from predictive model description 126.

In an operation 1218, the received event block object is processed through the one or more continuous queries 804 read from ESP configuration file 1114, for example, to predict a response variable value using the instantiated, compressed gradient boosting tree model.

In an operation 1220, the processed event block object is routed to event subscribing device 900. Subscribing devices can correlate a group of subscribed event block objects back to a group of published event block objects by comparing the unique ID of the event block object that a publisher, such as event publishing device 600, attached to the event block object with the event block ID received by a subscribing device, such as event subscribing device 900. The received event block objects further may be stored, for example, in a RAM or cache type memory of fifth computer-readable medium 1108. Event subscribing device 900 may receive the predicted response variable value from the procedural window that performs operation 410 of FIG. 4 on event block objects that include operational data.

In an operation 1222, a determination is made concerning whether or not processing is stopped. If processing is not stopped, processing continues in operation 1216 to continue receiving the one or more event streams containing event block objects from event publishing system 502. If processing is stopped, processing continues in an operation 1224.

In operation 1224, the started engines/projects/connectors are stopped and ESPE 800 is shutdown.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   train a gradient boosting tree predictive model using a plurality of observation vectors, wherein each observation vector of the plurality of observation vectors includes an explanatory variable value of an explanatory variable and a response variable value for a response variable, wherein the gradient boosting tree predictive model is trained to predict the response variable value of each observation vector based on a respective explanatory variable value of each observation vector;
   compress the trained gradient boosting tree predictive model using a compression model with a predefined penalty constant value and with a predefined array of coefficients to reduce a number of trees of the trained gradient boosting tree predictive model, wherein the compression model minimizes a sparsity norm loss function using a prediction result computed from each tree of the trained gradient boosting tree predictive model for each respective explanatory variable value; and
   output the compressed, trained gradient boosting tree predictive model for predicting a new response variable value from a new observation vector.

2. The non-transitory computer-readable medium of claim 1, wherein the compression model is selected from the group consisting of a least absolute shrinkage and selection operator compression model, a ridge compression model, and an elastic net compression model.

3. The non-transitory computer-readable medium of claim 2, wherein the least absolute shrinkage and selection operator compression model performs an L1-norm regression on the trained gradient boosting tree predictive model.

4. The non-transitory computer-readable medium of claim 2, wherein the ridge compression model performs an L2-norm regression on the trained gradient boosting tree predictive model.

5. The non-transitory computer-readable medium of claim 2, wherein the elastic net compression model performs a combination of an L1-norm and an L2-norm regression on the trained gradient boosting tree predictive model.

6. The non-transitory computer-readable medium of claim 1, wherein the computer-readable instructions further cause the computing device to:
   read a second explanatory variable value from a second dataset;
   compute the new response variable value using the output compressed, trained gradient boosting tree predictive model and the read second explanatory variable value; and
   output the computed new response variable value.

7. The non-transitory computer-readable medium of claim 6, wherein the computer-readable instructions further cause the computing device to:
   output an indicator of occurrence of an event based on the computed new response variable value.

8. The non-transitory computer-readable medium of claim 1, wherein each observation vector of the plurality of observation vectors includes a plurality of explanatory variable values, wherein the explanatory variable value is one of the plurality of explanatory variable values.

9. The non-transitory computer-readable medium of claim 8, wherein the compression model performs minimization of $$\min_{\beta} \frac{1}{N} \sum_{i=1}^{N} L\left(y_i, \beta_0 + \sum_{k=1}^{T} \beta_k f_k(x_i) + \sum_{p=1}^{d} \beta_{T+p} g_p(x_i)\right) + \lambda \|\beta\|,$$

where $\beta$ is the predefined array of coefficients, N is a number of observation vectors of the plurality of observation vectors, L is the sparsity norm loss function, $y_i$ is the response variable value associated with an ith observation vector of the plurality of observation vectors, T is the number of trees defined by the trained gradient boosting tree model, $f_k(x_i) = h_k(x_i) - h_{k-1}(x_i)$, $x_i$ is the explanatory variable value associated with the ith observation vector of the plurality of observation vectors, $g_p(x_i)$ is a function on a pth explanatory variable, d is a number of the plurality of explanatory variable values, $\lambda$ is the predefined penalty constant value, $h_k(x_i)$ is a prediction result from a kth tree, and $h_{k-1}(x_i)$ is a prediction result from a (k−1)th previous tree.

10. The non-transitory computer-readable medium of claim 9, wherein the sparsity norm loss function is at least one of an L1-norm and an L2-norm.

11. The non-transitory computer-readable medium of claim 1, wherein, after outputting the compressed, trained gradient boosting tree predictive model, the computer-readable instructions further cause the computing device to:
receive a second explanatory variable value from a second computing device in an event stream;
compute the new response variable value using the output compressed, trained gradient boosting tree predictive model and the received second explanatory variable value; and
output the computed new response variable value to a third computing device in a second event stream.

12. The non-transitory computer-readable medium of claim 11, wherein the computer-readable instructions further cause the computing device to:
output an indicator of occurrence of an event based on the computed new response variable value to the third computing device in the second event stream.

13. The non-transitory computer-readable medium of claim 11, wherein the computer-readable instructions further cause the computing device to:
output an indicator of occurrence of an event based on the computed new response variable value to a fourth computing device in a third event stream.

14. The non-transitory computer-readable medium of claim 1, wherein, after outputting the compressed, trained gradient boosting tree predictive model, the computer-readable instructions further cause the first computing device to:
instantiate an ESP engine (ESPE) on the computing device with the compressed, trained gradient boosting tree predictive model;
receive an event block object by the instantiated ESPE in a first event stream from a second computing device;
process the received event block object by the instantiated ESPE using the compressed, trained gradient boosting tree predictive model; and
output, by the instantiated ESPE, the processed event block object.

15. The non-transitory computer-readable medium of claim 14, wherein the processed event block object is output to a third computing device in a second event stream.

16. A computing device comprising:
a processor; and
a non-transitory computer-readable medium operably coupled to the processor, the computer-readable medium having computer-readable instructions stored thereon that, when executed by the processor, cause the computing device to
train a gradient boosting tree predictive model using a plurality of observation vectors, wherein each observation vector of the plurality of observation vectors includes an explanatory variable value of an explanatory variable and a response variable value for a response variable, wherein the gradient boosting tree predictive model is trained to predict the response variable value of each observation vector based on a respective explanatory variable value of each observation vector;
compress the trained gradient boosting tree predictive model using a compression model with a predefined penalty constant value and with a predefined array of coefficients to reduce a number of trees of the trained gradient boosting tree predictive model, wherein the compression model minimizes a sparsity norm loss function using a prediction result computed from each tree of the trained gradient boosting tree predictive model for each respective explanatory variable value; and
output the compressed, trained gradient boosting tree predictive model for predicting a new response variable value from a new observation vector.

17. A method of compressing a gradient boosting tree predictive model, the method comprising:
training, by a computing device, a gradient boosting tree predictive model using a plurality of observation vectors, wherein each observation vector of the plurality of observation vectors includes an explanatory variable value of an explanatory variable and a response variable value for a response variable, wherein the gradient boosting tree predictive model is trained to predict the response variable value of each observation vector based on a respective explanatory variable value of each observation vector;
compressing, by the computing device, the trained gradient boosting tree predictive model using a compression model with a predefined penalty constant value and with a predefined array of coefficients to reduce a number of trees of the trained gradient boosting tree predictive model, wherein the compression model minimizes a sparsity norm loss function using a prediction result computed from each tree of the trained gradient boosting tree predictive model for each respective explanatory variable value; and
outputting, by the computing device, the compressed, trained gradient boosting tree predictive model for predicting a new response variable value from a new observation vector.

18. The method of claim 17, wherein the compression model is selected from the group consisting of a least absolute shrinkage and selection operator compression model, a ridge compression model, and an elastic net compression model.

19. The method of claim 18, wherein the least absolute shrinkage and selection operator compression model performs an L1-norm regression on the trained gradient boosting tree predictive model.

20. The method of claim 18, wherein the ridge compression model performs an L2-norm regression on the trained gradient boosting tree predictive model.

21. The method of claim 18, wherein the elastic net compression model performs a combination of an L1-norm and an L2-norm regression on the trained gradient boosting tree predictive model.

22. The method of claim 17, further comprising:
reading, by the computing device, a second explanatory variable value from a second dataset;
computing, by the computing device, the new response variable value using the output compressed, trained gradient boosting tree predictive model and the read second explanatory variable value; and
outputting, by the computing device, the computed new response variable value.

23. The method of claim 17, wherein each observation vector of the plurality of observation vectors includes a plurality of explanatory variable values, wherein the explanatory variable value is one of the plurality of explanatory variable values.

24. The method of claim 23, wherein the compression model performs minimization of $$\min_{\beta} \frac{1}{N} \sum_{i=1}^{N} L\left(y_i, \beta_0 + \sum_{k=1}^{T} \beta_k f_k(x_i) + \sum_{p=1}^{d} \beta_{T+p} g_p(x_i)\right) + \lambda \|\beta\|,$$

where $\beta$ is the predefined array of coefficients, N is a number of observation vectors of the plurality of observation vectors, L is the sparsity norm loss function, $y_i$ is the response variable value associated with an ith observation vector of the plurality of observation vectors, T is the number of trees defined by the trained gradient boosting tree model, $f_k(x_i)=h_k(x_i)-h_{k-1}(x_i)$, $x_i$ is the explanatory variable value associated with the ith observation vector of the plurality of observation vectors, $g_p(x_i)$ is a function on a pth explanatory variable, d is a number of the plurality of explanatory variable values, $\lambda$ is the predefined penalty constant value, $h_k(x_i)$ is a prediction score from a kth tree, and $h_{k-1}(x_i)$ is a prediction result from a (k−1)th previous tree.

25. The method of claim 24, wherein the sparsity norm loss function is at least one of an L1-norm and an L2-norm.

26. The method of claim 17, further comprising:
receiving, by the computing device, a second explanatory variable value from a second computing device in an event stream;
computing, by the computing device, the new response variable value using the output compressed, trained gradient boosting tree predictive model and the received second explanatory variable value; and
outputting, by the computing device, the computed new response variable value to a third computing device in a second event stream.

27. The method of claim 26, further comprising:
outputting, by the computing device, an indicator of occurrence of an event based on the computed new response variable value to the third computing device in the second event stream.

28. The method of claim 26, further comprising:
outputting, by the computing device, an indicator of occurrence of an event based on the computed new response variable value to a fourth computing device in a third event stream.

29. The method of claim 17, further comprising:
instantiating, by the computing device, an ESP engine (ESPE) on the computing device with the compressed, trained gradient boosting tree predictive model;
receiving, by the instantiated ESPE, an event block object in a first event stream from a second computing device;
processing, by the instantiated ESPE, the received event block object using the compressed, trained gradient boosting tree predictive model; and
outputting, by the instantiated ESPE, the processed event block object.

30. The method of claim 29, wherein the processed event block object is output to a third computing device in a second event stream.

* * * * *

UNITED STATES PATENT AND TRADEMARK OFFICE
CERTIFICATE OF CORRECTION

PATENT NO. : 10,956,835 B2  Page 1 of 1
APPLICATION NO. : 16/297952
DATED : March 23, 2021
INVENTOR(S) : Rui Shi et al.

It is certified that error appears in the above-identified patent and that said Letters Patent is hereby corrected as shown below:

In the Specification

Column 10, Line 25:
Delete the phrase "$h_{final}(x) = h_T(x) = \sum_{i=1}^{T} h_i(x),$" and replace with
--$h_{final}(x) = h_T(x) = \sum_{i=1}^{T} h_i(x),$--.

Column 10, Line 50:
Delete the phrase "subsam pled data," and replace with --subsampled data,--.

Column 11, Line 23:
Delete the phrase "$\min_{\beta} \frac{1}{N} \sum_{i=1}^{N} L\left(Y_i, \beta_0 + \sum_{k=1}^{T} \beta_k f_k(x_i) + \sum_{p=1}^{d} \beta_{T+p} g_p(x_i)\right) + \lambda \|\beta\|,$"
and replace with --$\min_{\beta} \frac{1}{N} \sum_{i=1}^{N} L\left(y_i, \beta_0 + \sum_{k=1}^{T} \beta_k f_k(x_i) + \sum_{p=1}^{d} \beta_{T+p} g_p(x_i)\right) + \lambda \|\beta\|$--.

Column 11, Lines 27-28:
Delete the phrase "$\beta_0 + \sum_{k=1}^{T} \beta_k f_k(x_i) + \sum_{p=1}^{d} \beta_{T+p} g_p(x_i),$" and replace with
--$\beta_0 + \sum_{k=1}^{T} \beta_k f_k(x_i) + \sum_{p=1}^{d} \beta_{T+p} g_p(x_i)$--.

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*